United States Patent
Trickett

(10) Patent No.: US 11,112,517 B2
(45) Date of Patent: Sep. 7, 2021

(54) SYSTEM AND METHOD FOR INTERPOLATING SEISMIC DATA

(71) Applicant: CGG SERVICES SA, Massy (FR)

(72) Inventor: Stewart Trickett, Calgary (CA)

(73) Assignee: CGG SERVICES SAS, Massy (FR)

(*) Notice: Subject to any disclaimer, the term of this patent is extended or adjusted under 35 U.S.C. 154(b) by 1026 days.

(21) Appl. No.: 14/208,876

(22) Filed: Mar. 13, 2014

(65) Prior Publication Data

US 2014/0288838 A1 Sep. 25, 2014

Related U.S. Application Data

(60) Provisional application No. 61/804,287, filed on Mar. 22, 2013.

(51) Int. Cl.
- *G01V 1/30* (2006.01)
- *G01V 1/36* (2006.01)
- *G01V 1/28* (2006.01)
- *G01V 1/38* (2006.01)

(52) U.S. Cl.
CPC .............. *G01V 1/307* (2013.01); *G01V 1/36* (2013.01); *G01V 1/364* (2013.01); *G01V 1/28* (2013.01); *G01V 1/282* (2013.01); *G01V 1/30* (2013.01); *G01V 1/362* (2013.01); *G01V 1/38* (2013.01); *G01V 1/3808* (2013.01); *G01V 2210/57* (2013.01)

(58) Field of Classification Search
None
See application file for complete search history.

(56) References Cited

U.S. PATENT DOCUMENTS

| | | | |
|---|---|---|---|
| 2003/0150263 A1* | 8/2003 | Economides | E21B 49/006 73/152.48 |
| 2003/0204380 A1* | 10/2003 | Dishman | G01S 3/74 702/189 |
| 2004/0054479 A1* | 3/2004 | Trickett | G01V 1/36 702/14 |
| 2005/0068030 A1* | 3/2005 | Mansfield | G01R 33/385 324/309 |

(Continued)

OTHER PUBLICATIONS

Papy et al, "Exponential data fitting using multilinear algebra: The single-channel and multi-channel case"; Published online Jun. 13, 2005 in Wiley InterScience (www.interscience.wiley.com). DOI: 10.1002/nla.453. (Year: 2005).*

(Continued)

*Primary Examiner* — Catherine T. Rastovski
*Assistant Examiner* — Leonard S Liang
(74) *Attorney, Agent, or Firm* — Patent Portfolio Builders PLLC

(57) ABSTRACT

A system and method of interpolating seismic data is provided. The system and method form a plurality of pairwise Hankel tensors from acquired seismic data, and a respective pairwise Hankel tensor for each of a plurality of originally collected frequency slices, perform tensor completion on each of said pairwise Hankel tensors to recover a plurality of interpolated frequency slices, and combine said plurality of interpolated frequency slices with said originally collected frequency slices to form a set of trace data of a geographical area of interest.

20 Claims, 16 Drawing Sheets

(56) References Cited

U.S. PATENT DOCUMENTS

| | | | | |
|---|---|---|---|---|
| 2005/0114032 A1* | 5/2005 | Wang | | G01V 1/28 702/14 |
| 2006/0291328 A1* | 12/2006 | Robertsson | | G01V 1/36 367/24 |
| 2007/0018644 A1* | 1/2007 | Flexman | | G01R 33/56 324/307 |
| 2007/0274155 A1* | 11/2007 | Ikelle | | G01V 1/005 367/38 |
| 2008/0015783 A1* | 1/2008 | Robertsson | | G01V 1/36 702/14 |
| 2009/0070042 A1* | 3/2009 | Birchwood | | G01V 1/50 702/11 |
| 2009/0210160 A1* | 8/2009 | Suarez-Rivera | | G01V 11/00 702/6 |
| 2009/0247860 A1* | 10/2009 | Djuric | | G01R 33/281 600/420 |
| 2010/0088035 A1* | 4/2010 | Etgen | | G01V 1/30 702/16 |
| 2010/0212909 A1* | 8/2010 | Baumstein | | G01V 1/28 166/369 |
| 2010/0329077 A1* | 12/2010 | Ozbek | | G01V 1/36 367/38 |
| 2011/0134720 A1* | 6/2011 | Bratton | | G01V 1/44 367/35 |
| 2012/0090834 A1* | 4/2012 | Imhof | | G01V 1/307 166/250.01 |
| 2012/0281746 A1* | 11/2012 | Herrmann | | H04B 3/32 375/229 |
| 2013/0060539 A1* | 3/2013 | Baumstein | | G01V 1/28 703/2 |
| 2013/0194893 A1* | 8/2013 | Nagarajappa | | G01V 1/364 367/43 |
| 2014/0198613 A1* | 7/2014 | Yang | | G01V 1/362 367/24 |
| 2014/0369165 A1* | 12/2014 | Sinha | | G01V 1/50 367/25 |
| 2015/0316674 A1* | 11/2015 | Deschizeaux | | G01V 1/364 702/17 |

OTHER PUBLICATIONS

Narita A., Hayashi K., Tomioka R., Kashima H. (2011) "Tensor Factorization Using Auxiliary Information." In: Gunopoulos D., Hofmann T., Malerba D., Vazirgiannis M. (eds) Machine Learning and Knowledge Discovery in Databases. ECML PKDD 2011. Lecture Notes in Computer Science, vol. 6912. (Year: 2011).*

Rendle S., Thieme L.S.; "Pairwise Interaction Tensor Factorization for Personalized Recommendation"; WSDM' 10, Feb. 4-6, 2010, New York City, New York, USA (Year: 2010).*

Evrim Acar et al; "Workshop Report: Future Directions in Tensor-Based Computation and Modeling"; The Workshop was held in Arlington, Virginia at the National Science Foundation, Feb. 20-21, 2009. (Year: 2009).*

Miller M. and Ladenheim S.; "Higher Order Tensor Operations and Their Applications"; TCNJ Journal of Student Scholarship, vol. XI, Apr. 2009 (Year: 2009).*

Mukherjee, T., Pande V, and Varma V.; Pairwise Tensor Factorization for learning new facts in Knowledge Bases; Eleventh Worship on Mining and Learning with Graphs, Chicago, Illinois, USA; Copyright 2013 ACM 978-1-4503-2322-2 (Year: 2013).*

Extended European Search Report in corresponding European Application No. 14 160 749.9 dated Dec. 3, 2014.

S. Trickett, et al.; "Interpolation Using Hankel Tensor Completion"; GeoConvention 2013; Integration; XP055154292; pp. 1-4; May 6, 2013.

S. Trickett, et al.; "Interpolation using Hankel Tensor Completion"; SEG Technical Program Expanded Abstracts 2013; XP055154296; pp. 3634-3638; Aug. 19, 2013; Houston, TX.

J. Gao et al., "A Fast Reduced-Rank Interpolation Method for Prestack Seismic Volumes that Depend on Four Spatial Dimensions", Geophysics, Jan.-Feb. 2013, pp. V21-V30, vol. 78, No. 1.

T.G. Kolda et al., "Tensor Decompositions and Applications", SIAM Review, Jun. 10, 2008.

N. Kreimer et al., "A Tensor Higher-Order Singular Value Decomposition (HOSVD) for Pre-Stack Simultaneous Noise-Reduction and Interpolation", SEG Annual Meeting, San Antonio, Sep. 18-23, 2011, pp. 3069-3074.

N. Kreimer et al., "Tensor Completion via Nuclear Norm Minimization for 5D Seismic Data Reconstruction", SEG Annual Meeting, Las Vegas, Nov. 4-9, 2012, pp. 1-5.

V. Oropeza et al., "Simultaneous Seismic Data Denoising and Reconstruction via Multichannel Singular Spectrum Analysis", Geophysics, May-Jun. 2011, pp. V25-V32, vol. 76, No. 3.

D. Trad, "Five-Dimensional Interpolation: Recovering from Acquisition Constraints", Geophysics, Nov.-Dec. 2009, pp. V123-V132, vol. 74, No. 6.

S. Trickett et al., "Rank-Reduction-Based Trace Interpolation", SEG Annual Meeting, Denver, Oct. 2010, pp. 3829-3833.

Examination Report in corresponding Australian Application No. 2014201436 dated Sep. 18, 2017. (All references not cited herewith have been previously made of record.).

* cited by examiner

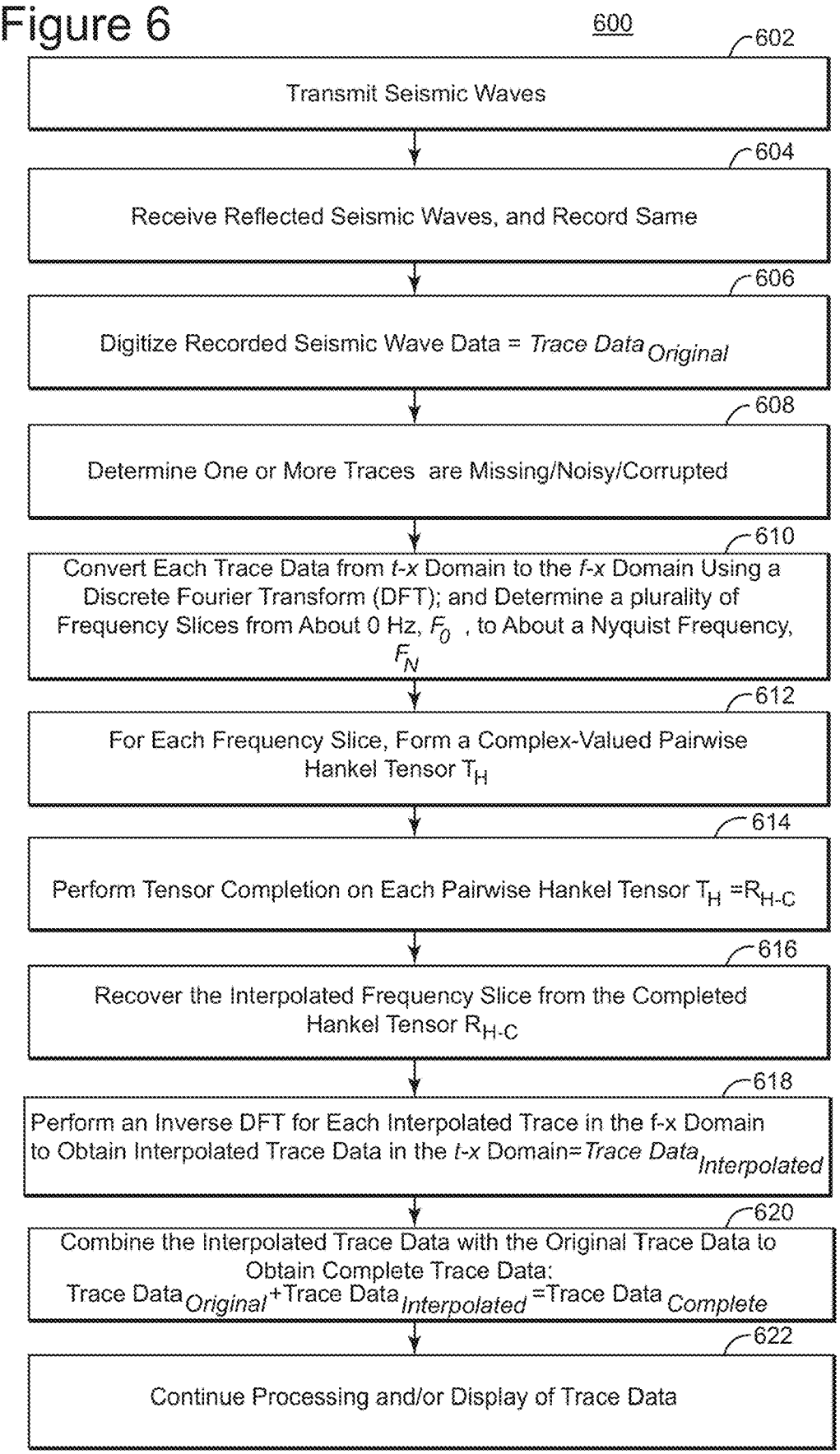

Figure 7A

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

Figure 7B

| 1 | 2 | 3 | 6 | 7 | 8 | 11 | 12 | 13 |
|---|---|---|---|---|---|---|---|---|
| 2 | 3 | 4 | 7 | 8 | 9 | 12 | 13 | 14 |
| 3 | 4 | 5 | 8 | 9 | 10 | 13 | 14 | 15 |
| 6 | 7 | 8 | 11 | 12 | 13 | 16 | 17 | 18 |
| 7 | 8 | 9 | 12 | 13 | 14 | 17 | 18 | 19 |
| 8 | 9 | 10 | 13 | 14 | 15 | 18 | 19 | 20 |
| 11 | 12 | 13 | 16 | 17 | 18 | 21 | 22 | 23 |
| 12 | 13 | 14 | 17 | 18 | 19 | 22 | 23 | 24 |
| 13 | 14 | 15 | 18 | 19 | 20 | 23 | 24 | 25 |

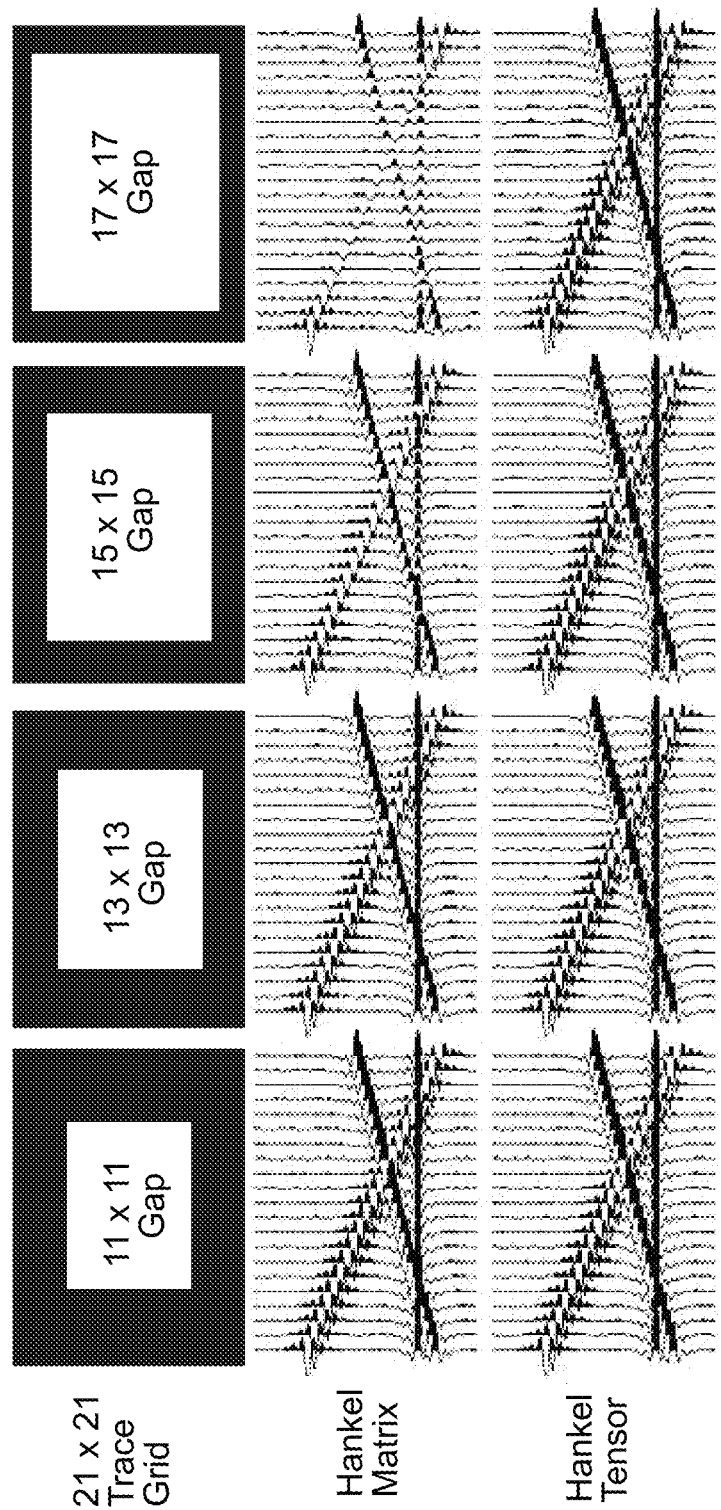

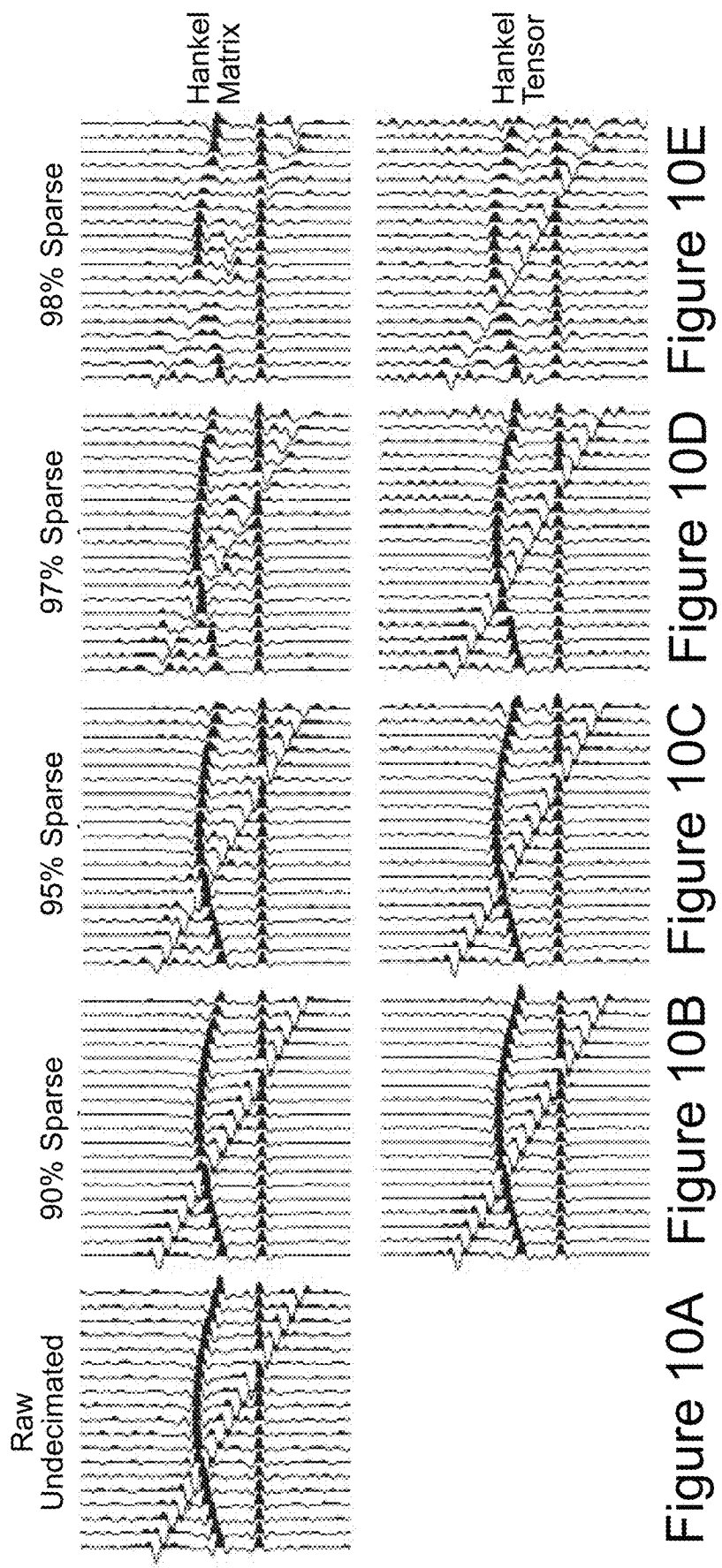

SYSTEM AND METHOD FOR INTERPOLATING SEISMIC DATA

PRIORITY INFORMATION

The present application claims priority under U.S.C. § 119(e) to U.S. Provisional Patent Application Ser. No. 61/804,287, filed 22 March, 2013, the entire contents of which are expressly incorporated herein by reference.

TECHNICAL FIELD

The present embodiments relate generally to land and marine seismic exploration systems and methods, and more specifically to systems and methods for interpolating seismic data.

BACKGROUND

Seismic waves generated artificially have been used for more than 50 years to perform imaging of geological layers. During seismic exploration operations, vibrator equipment (also known as a "source") generates a seismic signal that propagates in the form of a wave that is reflected at interfaces of geological layers. These reflected waves are received by geophones, or more generally receivers, which convert the displacement of the ground resulting from the propagation of the waves into an electrical signal that is recorded. Analysis of the arrival times and amplitudes of these waves make it possible to construct a representation of the geological layers on which the waves are reflected.

FIG. 1 depicts schematically a system 100 for transmitting and receiving seismic waves intended for seismic exploration in a marine environment. System 100 comprises a source 118 on a streamer or cable 116a, pulled from ship or boat 102, on the surface 106 of ocean 108 (or other water mass, such as a large lake or river). Source 118 is operable to generate a seismic signal. System 100 further includes a set of receivers 120 (e.g., hydrophones) for receiving a seismic signal and converting it into an electrical signal, also located on streamer 116b, and marine seismic data recording/processing system 128 for recording and processing the electrical signals generated by receivers 120. Streamers 116 can also include birds 122 for guiding and maintaining position of streamers 116. Source 118, receivers 120 can be intermixed on one or more streamers 116, in any order. FIG. 1 depicts source 118 as a single source but it should be understood that the source may be composed of several sources, as is well known to persons skilled in the art. Also part of system 100 are antennas 124 that can be used to transmit information and controls between ships 102, land bases, birds 122 (some birds 122 can also include antennas 124) and other devices.

In operation, source 118 is operated so as to generate a seismic signal. This signal propagates through water 108, in the form of transmitted waves 124 that generate reflected waves 126 when they reach an interface 110 between two layers 108 (ocean) and 112 (a geological layer, in this case, the ocean floor; it can also be appreciated by those of skill in the art that sometimes the transmitted waves 124 travel upwards instead of downwards, and when they reach the interface between atmosphere/air 104 and ocean 108 (i.e., at ocean surface 108) downward reflected waves 126 can also be generated (not shown); these are known by those of skill in the art as "ghosts"). Each receiver 120 receives one or more reflected waves 126 and converts them into an electrical signal. System 100 intends to image the subsurface regions 112 to determine the presence, or not, of hydrocarbon deposit 114.

FIG. 2 depicts schematically a system 200 for transmitting and receiving seismic waves intended for seismic exploration in a land environment. System 200 comprises a source 202 consisting of a vibrator operable to generate a seismic signal, a set of receivers 204 (e.g., geophones) for receiving a seismic signal and converting it into an electrical signal and land seismic data recording/processing system 206 for recording and processing the electrical signals generated by receivers 204. System 200 can further include antennas 124 for communications between vehicles 224, receivers 204, and land seismic data recording/processing system 206.

Source 202, receivers 204 and land seismic data recording/processing system 206 (located on vehicle 224b) are positioned on the surface of ground 208. FIG. 2 depicts source 202 as a single vibrator but it should be understood that the source may be composed of several vibrators, as is well known to persons skilled in the art. System 200 further includes vehicle 224a, for housing the source 202, and vehicle 224b for housing land seismic data recording/processing system 206, as well as antennas 124 for communications between vehicles 224a,b (and source 202) and receivers 204. The receivers 204 are interconnected by cables 226 and connected to land seismic data recording/processing system 206. Antennas 124 on receivers 204 can communicate data from receivers 204 to land seismic data recording/processing system 206, as can cables 226. Furthermore, in operation, vehicle 224a is generally not static, but generates transmitted waves in different locations for the geographic area of interest (GAI).

In operation, source 202 is operated so as to generate a seismic signal. This signal propagates firstly on the surface of the ground, in the form of surface waves 210, and secondly in the subsoil, in the form of transmitted waves 212 that generate reflected waves 214 when they reach an interface 220 between two geological layers (216, 218). Each receiver 204 receives both surface wave 210 and reflected wave(s) 214 and converts them into an electrical signal, which signal thus includes a component associated with reflected wave 214 and another component associated with surface wave 210. Since system 200 intends to image the subsurface regions 216 and 218, including hydrocarbon deposit 222, the component in the electrical signal associated with surface wave 210 is undesirable and should be filtered out.

It is known to those of skill in the art that seismic processing techniques often assume that collected data is regularly sampled in space, but acquisition methods, particularly in marine environments, rarely achieve this in practice. Data exhibiting large gaps and irregular sampling requires interpolation and regularization prior to further processing. Furthermore, recent advances in processing and acquisition technologies have made interpolation in multi-dimensions important in some applications.

Interpolating in four spatial dimensions simultaneously, known as 5D interpolation, has become widespread as it can overcome acquisition constraints for 3D seismic surveys (see, Trad, D., 2009, "Five-Dimensional Interpolation: Recovering from Acquisition Constraints," Geophysics, 74, no. 6, V123-V132). Pre-stack traces, however, can often be noisy, and when placed on a regular four-dimensional grid can be sparse and have large gaps, and interpolators tend not perform well under these difficult conditions.

Accordingly it would be desirable to provide methods, modes and systems for interpolation that overcomes the problems with conventional interpolation techniques, such as an interpolation process for use with multi-dimensional grids and when the data is either or both noisy or sparse, prior to further processing.

SUMMARY

An aspect of the embodiments is to substantially solve at least one or more of the problems and/or disadvantages discussed above, and to provide at least one or more of the advantages described below.

It is therefore a general aspect of the embodiments to provide methods, modes and systems for interpolation that will obviate or minimize problems of the type previously described.

According to a first aspect of the embodiments, a method of interpolating seismic data is provided comprising interpolating seismic data using a pairwise Hankel tensor from said seismic data.

According to a second aspect of the embodiments, a method of interpolating seismic data is provided comprising forming a plurality of pairwise Hankel tensors from acquired seismic data, a respective pairwise Hankel tensor for each of a plurality of originally collected frequency slices, performing tensor completion on each of said pairwise Hankel tensors to recover a plurality of interpolated frequency slices, and combining said plurality of interpolated frequency slices with said originally collected frequency slices to form a set of trace data of a geographical area of interest.

According to a third aspect of the embodiments, a method of interpolating seismic data is provided comprising forming a plurality of pairwise Hankel tensors as multi-order tensors from said acquired seismic data, a respective pairwise Hankel tensor for each of a plurality of originally collected frequency slices, wherein said forming of pairwise Hankel tensors includes acquiring seismic wave data as seismic trace data, converting each of said seismic trace data from a t-x domain to an f-x domain to form a plurality of frequency slices S, wherein said plurality of frequency slices S ranges from $F_0$, of about 0 hertz, to $F_N$, about a Nyquist frequency, and wherein each of said plurality of frequency slices S includes a first number of spatial dimensions D, determining a length of each of said spatial dimensions D, wherein for each dimension i of said plurality of frequency slices S, i=1 . . . , D each dimension is L(i) in length, specifying a Hankel tensor number of modes as 2D, specifying a length of each of said tensor modes as L(i)/2+1 for a first and any odd number of said tensor modes, and (L(i)+1)/2 for a second and any even number of said tensor modes, and further wherein if any tensor mode length is a fraction said fractional tensor mode length is reduced to a next lowest whole number, and specifying a value for any particular pairwise Hankel tensor element according to the following expression—

$$S(j_1+j_2-1, j_3+j_4-1, \ldots, j_m+j_n-1),$$

wherein m=2D−1, n=2D, and j's range over all possible values for said tensor, performing tensor completion on each of said tensors to recover a plurality of interpolated frequency slices, and combining said plurality of interpolated frequency slices with said originally collected frequency slices to form trace data of the geographical area of interest.

According to a fourth aspect of the embodiments, a system for interpolating seismic data is provided comprising a receiver configured to acquire transmitted seismic data, and a processor configured to form a plurality of pairwise Hankel tensors from said acquired seismic data and a respective pairwise Hankel tensor for each of a plurality of originally collected frequency slices, perform tensor completion on each of said pairwise Hankel tensors to recover a plurality of interpolated frequency slices, and combine said plurality of interpolated frequency slices with said originally collected frequency slices to form a set of trace data of a geographical area of interest.

BRIEF DESCRIPTION OF THE DRAWINGS

The above and other aspects of the embodiments will become apparent and more readily appreciated from the following description of the embodiments with reference to the following figures, wherein like reference numerals refer to like parts throughout the various figures unless otherwise specified, and wherein:

FIG. 6 illustrates a method for seismic data interpolation using pairwise Hankel tensor completion according to an embodiment;

FIGS. 7A-7B illustrate an example of a two dimensional frequency slice following Fourier transformation, and a Hankel matrix formulated based on the two dimensional frequency slice, respectively;

FIGS. 9A-9D illustrate examples of intentionally formed gaps in synthetically generated seismic trace data, and interpolation results using a Hankel matrix method, and the pairwise Hankel tensor completion as shown and described in regard to FIG. 6 according to an embodiment;

FIG. 10A illustrates a two dimensional portion of raw un-decimated synthetic data in four spatial dimensions, and FIGS. 10B-10E illustrate, respectively, interpolation using the Hankel matrix method and the pairwise Hankel tensor completion as shown and described in regard to FIG. 6 according to an embodiment for four different remaining amounts of raw un-decimated synthetic data;

DETAILED DESCRIPTION

Figure 1:
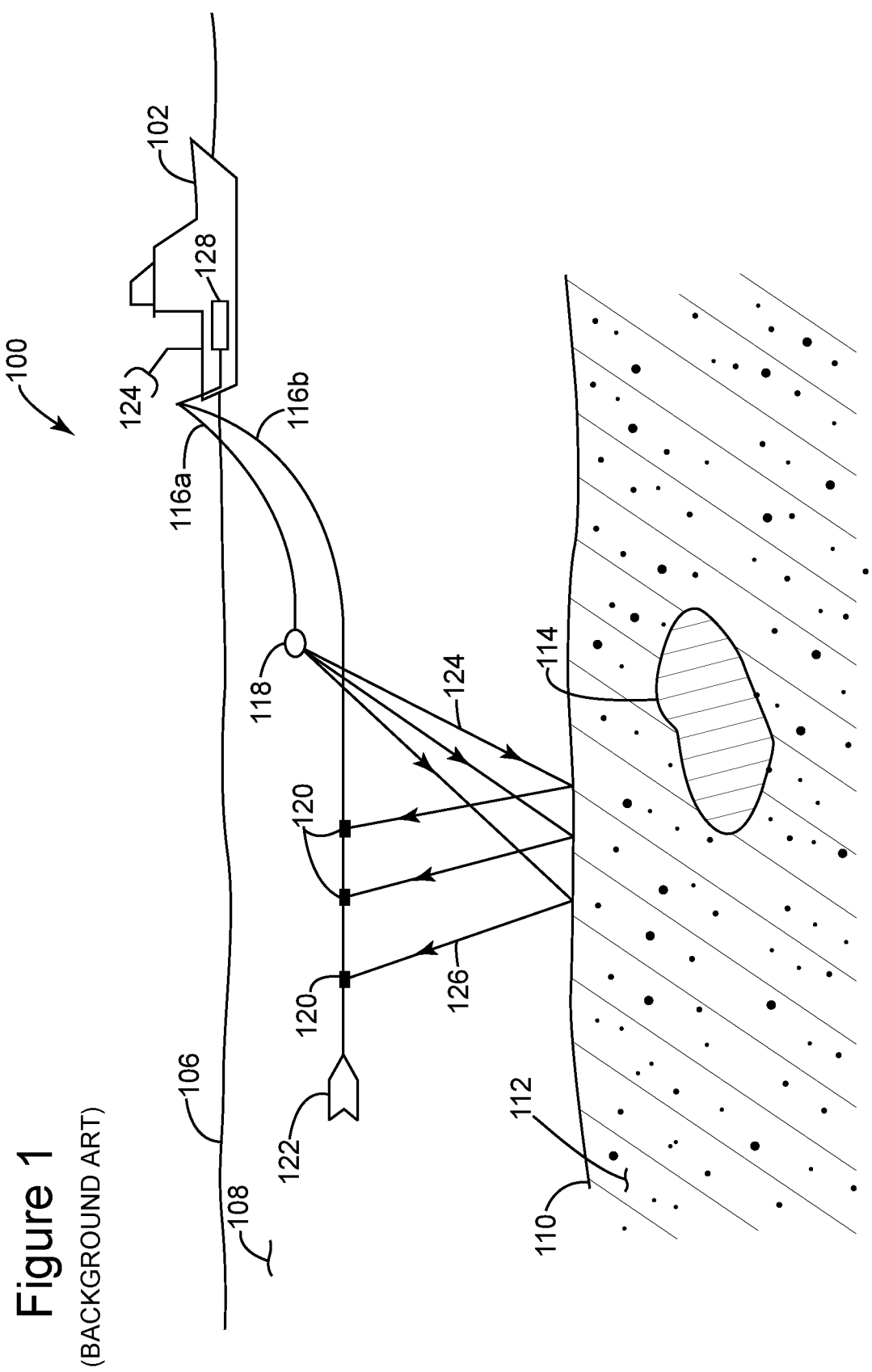
FIG. 1 illustrates a side view of a marine seismic exploration system for use in an underwater seismic gathering process.

The concepts associated with these embodiments are described more fully hereinafter with reference to the accompanying drawings, in which embodiments are shown. In the drawings, the size and relative sizes of layers and regions may be exaggerated for clarity. Like numbers refer to like elements throughout. These concepts may, however, be embodied in many different forms and should not be construed as limited to the embodiments set forth herein. Rather, these embodiments are provided so that this disclosure will be complete, and will convey the scope of these concepts to those skilled in the art. The scope of the embodiments is therefore defined by the appended claims. The following embodiments are discussed, for simplicity, with regard to a method for interpolating received seismic data using pairwise Hankel tensor completion in the context of marine seismic acquisition. The embodiments to be discussed next are not limited to a marine based seismic acquisition, but may be applied to other systems that conventionally involve interpolation of acquired seismic data. Reference throughout the specification to "one embodiment" or "an embodiment" means that a particular feature, structure, or characteristic described in connection with an embodiment is included in at least one embodiment of the present embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

According to embodiments, the problems described above can be addressed by, for example, interpolating received seismic data, whether it be a land or marine seismic exploration system. According to an embodiment, such interpolation can include the use of pairwise Hankel tensors and their subsequent completion. Because of the nature of the pairwise Hankel tensors formed according to embodiments described herein, significant reductions of data processing expenditures can be realized. According to an embodiment, such reductions in data processing exhibit themselves in terms of increased processing times, and according to a further embodiment, the speed-up in processing is about three times for 5D interpolation. Given the significant expense of 5D interpolation in terms of time and money, a three-fold improvement in processing time is substantially significant. This reduction in processing expenditures can be related to the reduced length of the outer products that are generated when formation of the pairwise Hankel tensors occurs according to an embodiment. An explanation of tensors, generally, and pairwise Hankel tensors, specifically, will be provided below.

Figure 2:
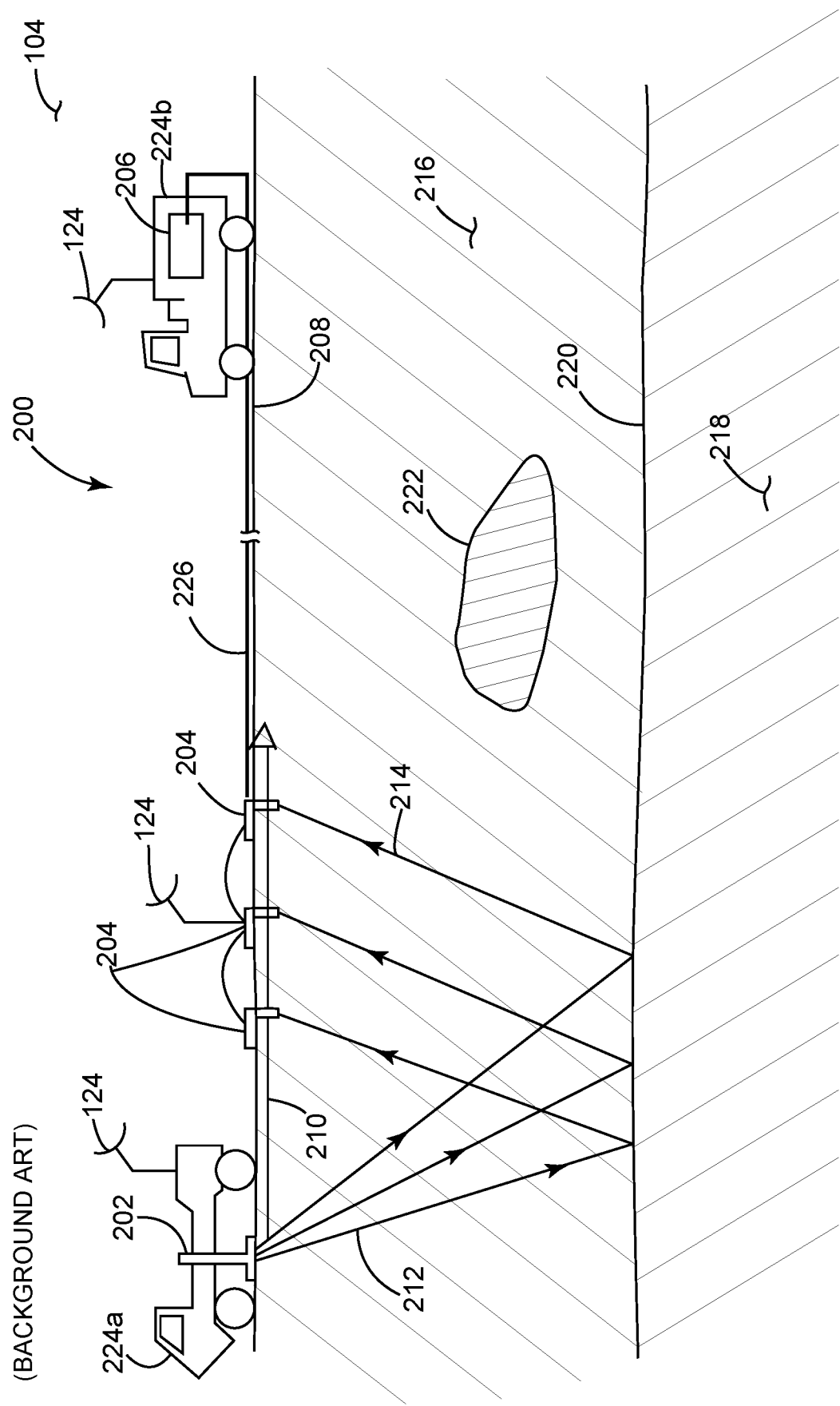
FIG. 2 illustrates a side view of a land seismic exploration system for use in a land seismic gathering process.
Figure 3:
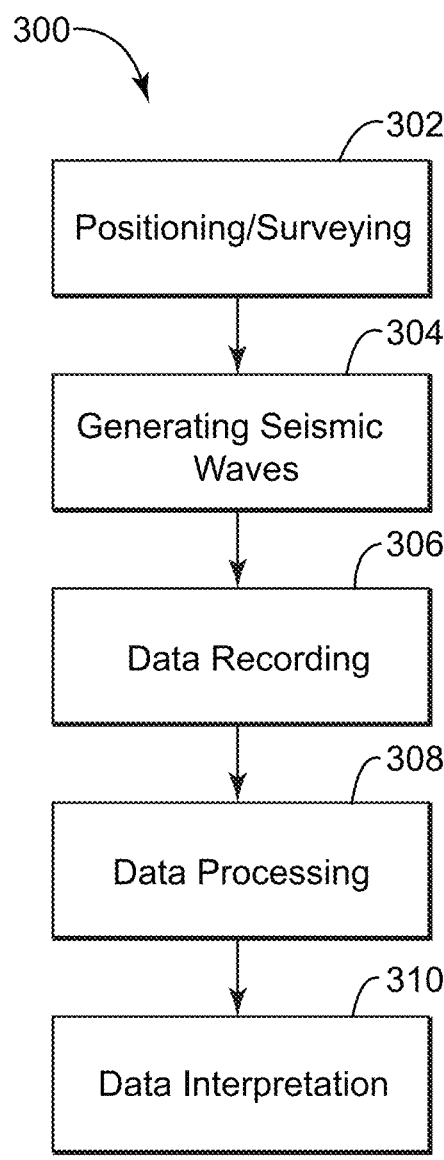
FIG. 3 illustrates a general method for seismic data interpolation.

Prior to discussing such tensor interpolation embodiments in more detail, it may be useful to consider the overall seismic exploration process in general for context. As generally discussed above, one purpose of seismic exploration is to render the most accurate graphical representation possible of specific portions of the Earth's subsurface geologic structure, e.g., using the seismic data which is collected as described above with respect to FIG. 1 (and FIG. 2 in a land embodiment). The images produced allow exploration companies to accurately and cost-effectively evaluate a promising target (prospect) for its oil and gas yielding potential (e.g., hydrocarbon deposits 120). FIG. 3 illustrates a generalized method 300 for seismic exploration that includes both the acquisition of the seismic data described above, and the subsequent processing of that seismic data to form such images.

In FIG. 3, the overall process is broken down into five steps, although one could of course characterize seismic exploration in a number of different ways. Step 302 references the initial positioning of the survey equipment in the GAI and the preparation to begin surveying the GAI in a manner that is precise and repeatable. Seismic waves are generated by the afore-described sources or vibrators (step 304), and data recording is performed on the reflected, scattered and surface waves by the receivers (step 306). In step 308, processing of the raw, recorded seismic data occurs. Data processing generally involves numerous processes intended, for example, to interpolate the recorded data and involves a significant amount of computer processing resources, including the storage of vast amounts of data, and multiple processors or computers running in parallel. In particular, for the embodiments discussed below, such processing includes interpolating to fill in missing data. Such data processing can be performed on site, back at a data processing center, or some combination thereof. Finally, in step 310, data interpretation occurs and the results can be displayed or generated as printed images, sometimes in two-dimensional form, more often now in three dimensional form. Four dimensional data presentations (i.e., a sequence of 3D plots or graphs over time) are also possible outputs, when needed to track the effects of, for example, extraction of hydrocarbons from a previously surveyed deposit.

With this context in mind, the discussion shall now focus on the mathematical basis for interpolation methods according to embodiments. This discussion shall begin by first describing tensors generally, then a known method for tensor interpolation, and then discussing the method for interpolation using pairwise Hankel tensor completion according to an embodiment. Throughout, matrices are denoted by capital letters in bold (e.g., matrix "M"), and vectors by small letters in bold (e.g., vector "v").

Different mathematical concepts and methods have been introduced recently by those of skill in the art to increase interpolation performance. One such concept is a tensor. A tensor is basically a multi-way array (see, e.g., Kolda, T. G., et al., 2009, "Tensor Decompositions and Applications," SIAM Review, 51, no. 3, 455-500). For example, a vector is a first-order tensor, a matrix is a second-order tensor, and a cube of values is a third-order tensor.

An outer product (which operation is designated by the symbol "$\circ$") is the multiplication of n vectors to form a tensor of order p. For example, the outer product of two vectors a and b forms a matrix M, as represented in Equation (1):

$$M = a \circ b = ab^T \text{ where } M(i,j) = a(i)b(j) \tag{1}$$

Figure 4:
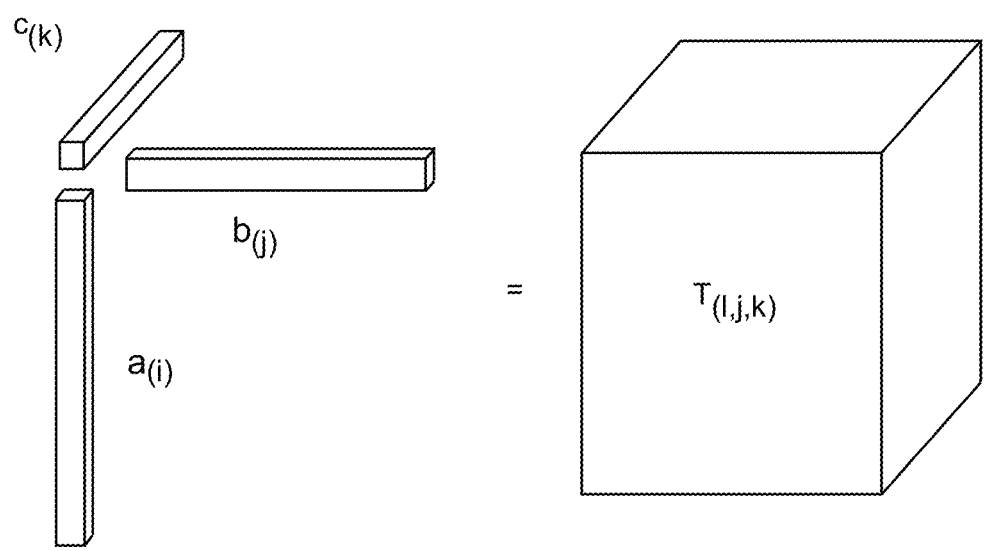
FIG. 4 illustrates pictorially the outer product of three vectors forming a third-order tensor.

The outer product of three vectors a, b, and c, forms a third-order tensor T, as represented in Equation (2) and shown in FIG. 4:

$$T = a \circ b \circ c \text{ where } T(i,j,k) = a(i)b(j)c(k) \tag{2}$$

As known by those of skill in the art, there are many ways to define tensor rank. One way is to define a tensor as having rank k if it can be written as the sum of k (but no fewer) outer products. Thus the tensor in FIG. 4 has rank one. Note, however, that rank and order are not the same; the tensor of FIG. 4 is a third order tensor (p=3), but has a rank k of 1.

Recently there have been developments in seismic trace interpolation based on tensor completion. As will be appreciated by those skilled in the art, tensor completion refers to a process for adding entries to a tensor which has unknown or missing entries. Beginning with a multi-dimensional grid of seismic traces with some traces missing, a general method of interpolation to replace the missing traces can be illustrated as shown in FIG. 5.

Figure 5:
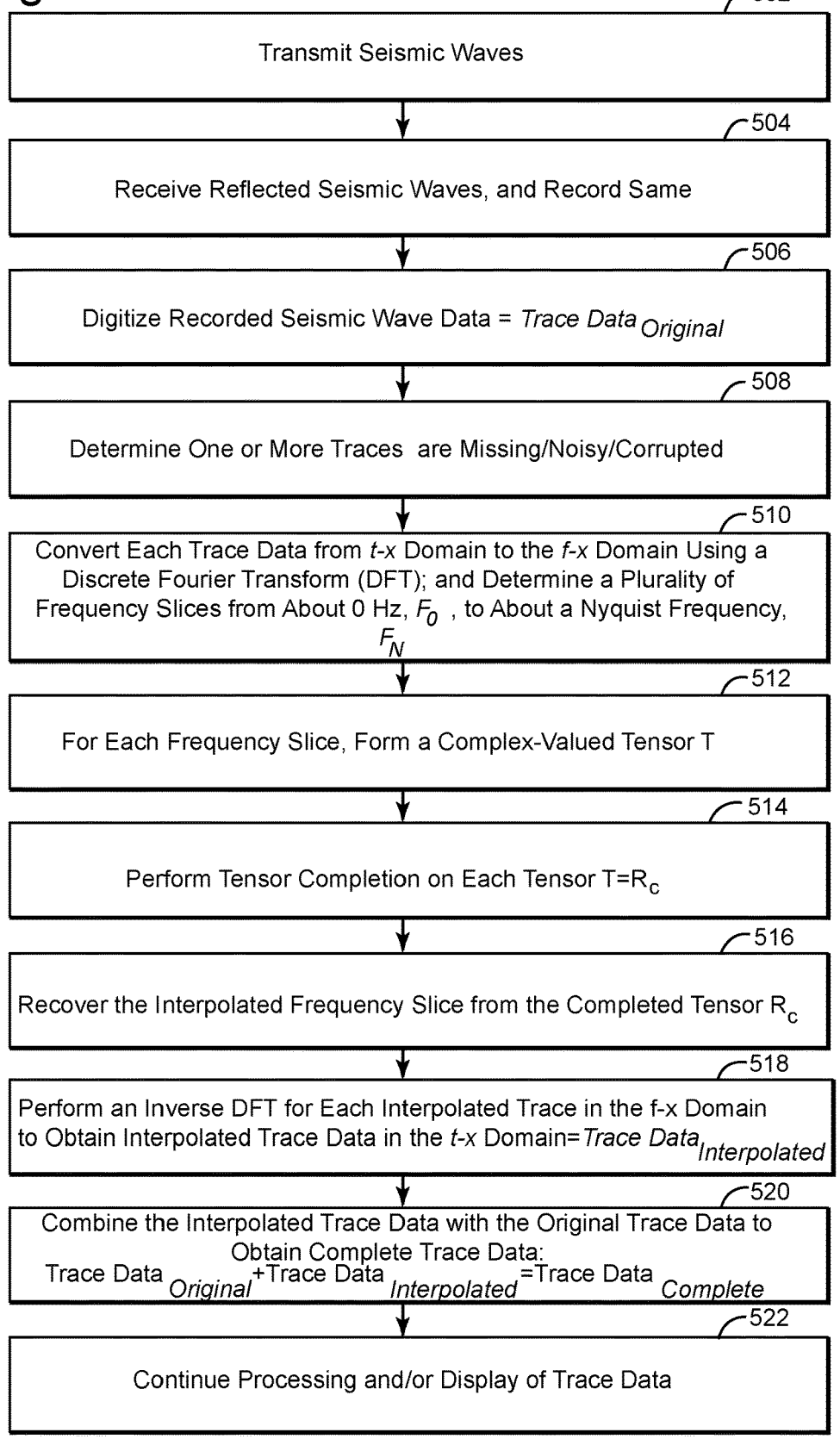
FIG. 5 illustrates a general method for seismic data interpolation using tensor completion.

FIG. 5 illustrates a conventional method 500 for interpolating acquired seismic data using tensor completion as will be known to those of skill in the art. Method 500 begins with step 502, wherein seismic waves are transmitted by sources, as shown in FIGS. 1 and 2. In step 504, the same transmitted waves are reflected off of interfaces, geographical features underground (and sometimes within the water in marine embodiments) and received by the receivers of FIGS. 1 and 2. Then, they are stored in the data recording/processing devices, in step 506, and most often digitized. According to an embodiment, it shall be presumed that all received data is digitized in order to perform further additional processing. The digitized, recorded seismic wave data is now known as Trace Data$_{Original}$. In step 508, one or more of the trace data are determined to be missing and/or noisy and/or corrupt, and/or unusable, for any of a multitude of reasons, and it is further determined that interpolation of the received and stored data should occur. In step 510, method 500 converts each of the original trace data from the t-x domain to the f-x domain using a discrete Fourier transform (DFT). DFTs are well known to those of skill in the art, and any method to compute DFTs can be used. Once the trace data is in the frequency-distance/position domain, method 500 determines a plurality of frequency slices from about 0 Hz, $F_0$, to about a Nyquist frequency, $F_N$.

In step 512, for each frequency slice, $F_0$ to $F_N$, a complex-valued tensor T is formed. Formation of the tensor T is discussed in greater detail below. Then, in step 514, tensor completion is performed on each tensor T, and the tensor completion is represented as $R_C$. The process of tensor completion is discussed in greater detail below. The steps of forming the tensor T, and tensor completion, as discussed below, provide the interpolated data for the trace data (once transformed back into the t-x domain).

Following formation and subsequent completion of the tensor T, to form $R_C$, method 500, in step 516, recovers the interpolated frequency slice from the completed tensor $R_C$. The process of recovering the interpolated frequency slice is performed using the known technique of, for each trace in the grid, averaging over every tensor element in which that trace's frequency value was originally placed. At this point, the recovered interpolated data is in frequency slice form, and in the f-x domain. Consequently, therefore, in step 518, method 500 performs an inverse DFT on the frequency values for each trace to obtain interpolated trace data in the t-x domain. This t-x trace data is represented as Trace Data$_{Interpolated}$. In step 520, method 500 then combines the interpolated trace data, Trace Data$_{Interpolated}$, with the original trace data, Trace Data$_{Original}$, to obtain complete trace data, Trace Data$_{Complete}$:

$$\text{Trace Data}_{Original} + \text{Trace Data}_{Interpolated} = \text{Trace Data}_{Complete} \quad (3).$$

Following method step 520, further processing and/or displaying of the trace data occurs in step 522.

At least two methods exist for forming the tensor in step 512. A first method forms block Hankel matrices (see, Trickett, S. R., et al., 2010, "Rank-Reduction-Based Trace Interpolation," 80th Annual International Meeting, SEG, Expanded Abstracts, 3829-3833, and Oropeza, V. E., et al., 2011, "Simultaneous Seismic Data De-Noising and Reconstruction via Multichannel Singular Spectrum Analysis (MSSA)," Geophysics, 76, no. 3, V25-V32). Note that a matrix is a $2^{nd}$-order tensor. As will be appreciated by those skilled in the art, Hankel matrices are matrices that are constant along their anti-diagonals. A block Hankel matrix is a matrix composed of sub-matrices which are identical along the matrix's anti-diagonals. These sub-matrices may themselves be block Hankel matrices. For the dual purposed of clarity and brevity, the block Hankel matrix will be referred to as simply a Hankel matrix. Some of the matrix entries will be unknown (and thus in need of interpolating) due to missing traces. According to an embodiment, the completion of these matrices is referred to as Hankel matrix completion.

A second method known to those of skill in the art takes the grid of complex values as a tensor without rearranging the values (as described for example in Kreimer, N., et al., 2011, "A tensor Higher Order Singular Value Decomposition (HOSVD) for Pre-Stack Simultaneous Noise-Reduction and Interpolation," 81st Annual International Meeting, SEG, Expanded Abstracts, 3069-3074), so that the number of spatial dimensions equals the tensor order. Again some of the tensor entries will be unknown (and thus in need of interpolating) due to missing traces. This method for supplying missing or unknown tensor entries can be referred to according to embodiments as direct tensor completion.

In step 514, as briefly described above, tensor completion is performed to fill in the unknown elements. A known method for tensor completion finds a low-rank tensor R that fits as closely as possible the known elements of the tensor T determined in step 512. That is, R minimizes:

$$\|Z(T-R)\|_F \quad (4),$$

where $\|\cdot\|_F$ is the Frobenius norm and $Z(\cdot)$ is an operator that zeroes out all elements that are unknown in T. The Frobenius norm can be described as a matrix norm of an m×n matrix A defined as the square root of the sum of the absolute squares of its elements, and shown as below mathematically:

$$\|A\|_F = \sqrt{\sum_{i=1}^{m} \sum_{j=1}^{n} |a_{i,j}|^2} . \quad (5)$$

Tensor R, therefore, provides an approximation to the unknown tensor elements, and thus to the missing traces. That is, in determining R to minimize the Frobenius norm, data that is generated represents the missing trace data, albeit in the f-x domain, and in matrix form, but which can be readily converted to trace data in the t-x domain, as known to those of skill in the art.

The step of recovering the interpolated frequency slice, method step 516, can be accomplished by averaging over every tensor element in which each frequency slice value was originally placed. At this point, the recovered interpolated data is in frequency slice form, and in the f-x domain. Consequently, therefore, in step 518, method 500 performs an inverse DFT for each interpolated trace in the f-x domain to obtain an interpolated trace data in the t-x domain. This t-x trace data is represented as Trace Data$_{Interpolated}$. In step 520, method 500 then combines the interpolated trace data, Trace Data$_{Interpolated}$, with the original trace data, Trace Data$_{Original}$, to obtain complete trace data, Trace Data$_{Complete}$. In method step 522 further processing and/or displaying of the trace data occurs.

Attention is now directed towards FIG. 6, which illustrates method 600 for interpolation of seismic data using pairwise Hankel tensor completion according to an embodiment. According to an embodiment, method steps 602-610 are substantially similar to those of method steps 502-510, and method steps 616-622 are also substantially similar to those of method steps 516-522, and so, in fulfillment of the dual purposes of clarity and brevity, a detailed discussion of the same has been omitted. Thus, method 600 for interpolation of seismic data using pairwise Hankel tensor completion begins with step 602 and proceeds to step 610, wherein a plurality of frequency slices now exist from about 0 Hz, $F_0$, to about the Nyquist frequency, $F_N$.

Method steps 612 and 614 can be referred to together as performing a pairwise Hankel tensor completion according to an embodiment. Prior to discussing steps 612 and 614 in detail, an explanation of pairwise Hankel tensors specifically and the benefits of using pairwise Hankel tensors as interpolators according to embodiments, will first be explained.

A fourth-order tensor T is considered to be a pairwise Hankel tensor when it meets the following condition:

$$T(i_1,i_2,i_3,i_4)=T(j_1,j_2,j_3,j_4) \text{ whenever } i_1+i_2=j_1+j_2 \text{ and } i_3+i_4=j_3+j_4$$

With this context in mind regarding pairwise Hankel tensors, the discussion returns to steps 612 and 614 of the embodiment of FIG. 6. In step 612, method 600 forms a complex-valued Hankel tensor T for each frequency slice. In forming the tensor T, it is presumed, as discussed above, that a raw frequency slice S is provided or obtained (as described in step 610 of method 600). The raw frequency slice S has two spatial dimensions with lengths $s_1$ and $s_2$. As those of skill in the art can appreciate, the dimensions can represent any of numerous different spatial attributes. By way of a non-limiting example, the two dimensions can represent the x and y coordinates of the trace midpoint. Furthermore, the actual value of the function is a complex number representing both amplitude and phase. A fourth-order pairwise Hankel tensor $T_H$ is formed by first generating two tensor orders for every spatial dimension:

$$T_{H(i,j,m,n)}=S(i+j-1,m+n-1) \quad (6),$$

where the lengths of the four tensor directions, i, j, m, n, are, respectively:

$$\text{length of } i = \frac{s_1}{2}+1; \quad (7A)$$

$$\text{length of } j = \frac{(s_1+1)}{2}; \quad (7B)$$

$$\text{length of } m = \frac{s_2}{2}+1; \quad (7C)$$

and $$\text{length of } n = \frac{(s_2+1)}{2}, \quad (7D)$$

wherein if the length is a fraction, it is rounded down to the nearest whole number. The lengths represent the length of the tensor that method 600 will be extracting a low-rank approximation to.

Figure 8:
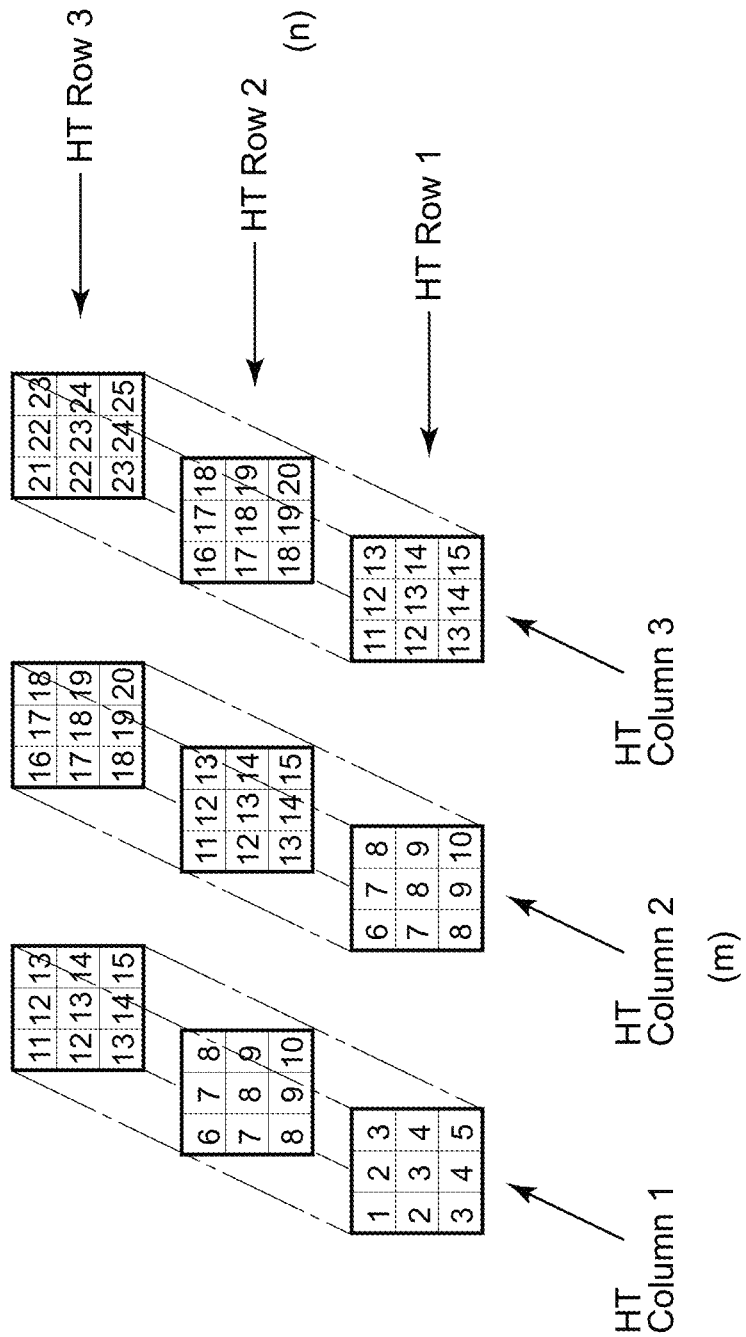
FIG. 8 illustrates a pairwise Hankel tensor based on the two dimensional frequency slice of FIG. 7A generated using a pairwise Hankel tensor formation process according to an embodiment.

To visually convey the operation of step 612, consider the purely illustrative example shown in FIGS. 7A-7B and 8. Therein, FIG. 7A illustrates an original unmodified 5×5 frequency slice, FIG. 7B illustrates the result of a conversion of the original 5×5 frequency slice into a 9×9 Hankel matrix, and FIG. 8 illustrates the result of a conversion of the original 5×5 frequency slice into a 3×3×3×3 fourth-order pairwise Hankel tensor according to an embodiment. For ease of illustration, each block of the 5×5 frequency slice has been uniquely numbered, 1-25, and the location of each block from the original frequency slice can therefore be readily determined in the 9×9 block-Hankel matrix (FIG. 7B), and the 3×3×3×3 fourth-order pairwise Hankel tensor (FIG. 8).

The pairwise Hankel tensor of FIG. 8 is formed using Equation (6) and the 5×5 frequency slice of FIG. 7A in the following manner. Note that for purposes of illustration, each block of the 5×5 frequency slice of FIG. 7A has been uniquely numbered, so that its corresponding position within the pairwise Hankel tensor of FIG. 8 can be readily identified. For purposes of illustration, element 17 will be used. Element 17 is located in the frequency slice of FIG. 7A at $S_{2,4}$. The location of any frequency slice component within the pairwise Hankel tensor, determined according to Equation (6), $T_{H(i,j,m,n)}$ represents the $i^{th}$ column and $j^{th}$ row of the $m^{th}$ pairwise Hankel tensor (HT) column, and $n^{th}$ pairwise Hankel tensor (HT) row, as shown in FIG. 8.

Therefore, for a pairwise Hankel tensor position of i=1, j=2, m=3, and n=2, this corresponds to $T_{H(i,j,m,n)}=T_{H(1,2,3,2)}$, or the first column and second row of the third HT column and second HT row. The corresponding frequency slice component would be, according to Equation (6):

$$S_{(i+j-1,m+n-1)}=S_{(1+2-1,3+2-1)}=S_{(2,4)} \quad (8)$$

which is element 17, as FIGS. 7A and 8 confirm.

The use of fourth order pairwise Hankel tensors in this description is purely illustrative, and other orders are contemplated by these embodiments. As those of skill in the art can appreciate, the pairwise Hankel tensor according to an embodiment can be configured for higher-order tensors when the input frequency slice assumes higher number of dimensions. For example, if there are four spatial dimensions (for example, two dimensions to describe source location and two dimensions to describe receiver location), then the eighth-order pairwise Hankel tensor according to an embodiment can be constructed as follows:

$$T_{H(i,j,m,n,p,q,r,s)}=S(i+j-1,m+n-1,p+q-1,r+s-1) \quad (9),$$

wherein the tensor locating variable are defined as follows (i, j, m, and n being the same as previously described, and p, q, r, and s being the indices for the $5^{th}$, $6^{th}$, $7^{th}$, and $8^{th}$ modes of the tensor. As is further known to those of skill in the art, mathematics can define multi-dimensional characteristics to phenomena that are useful theoretical concepts, but which are difficult to visualize and/or describe. Nonetheless, any multi-dimensional description of trace data that can be constructed should be considered as within the aspects of the different embodiments disclosed herein, in that for any m-dimensional set of data, a pairwise Hankel tensor of order 2m can be constructed according to an embodiment.

Both Equations (6) and (9) above are specific embodiments of a method for forming a pairwise Hankel tensor for use in method 600 according to an embodiment. However, the formation of the pairwise Hankel tensor is not limited, and should not be construed to be so limited, to said examples; instead, a pairwise Hankel tensor can be constructed using any multi-dimensional frequency slice according to an embodiment, as now described.

Each direction of a tensor is referred to as a "mode". Thus a 4th-order tensor has 4 modes. The obtained frequency slice S can have D spatial dimensions, wherein for each dimension i, i=1 . . . , D each dimension is L(i) in length. When building the pairwise Hankel tensor from the frequency slice S, there are at least three specifications to determine according to an embodiment: the tensor order (number of modes); the length of each mode; and value of each tensor element. According to an embodiment, the pairwise Hankel tensor order is 2D. According to a further embodiment, the lengths of each of the tensor modes are defined as 2i and 2i+1, wherein i=1 . . . D, and therefore can further be defined as (L(i)+1)/2 and L(i)/2+1. For any length that is a fraction, it is reduced to the next lower number according to an embodiment (e.g., 3½ becomes 3). According to a further embodiment, the lengths of the two nodes of the tensor relative to the length of the spatial dimension it is related to, is constrained by the following: the sum of the two mode lengths is equal to L(i)+1. According a further embodiment, and as can be appreciated by those of skill in the art, there are other ways to set the lengths of the modes. In regard to the value of any particular pairwise Hankel tensor element, $T(j_1, j_2, j_3, j_4, \ldots, j_m, j_n)$, where m=2D−1, and n=2D, the pairwise Hankel tensor element is determined according to:

$$S(j_1+j_2-1, j_3+j_4-1, \ldots j_m j_n-1) \quad (10),$$

wherein the j's range over all possible values for the tensor.

As those of skill in the art can appreciate, there are many other ways to create a tensor from a frequency slice. The pairwise Hankel tensor shown in FIG. 8 and described above according to an embodiment has the same elements as the Hankel matrix method (FIG. 7C), but arranged in a different pattern. The use of pairwise Hankel tensors according to embodiments provides certain benefits when used to interpolate seismic data. For example, pairwise Hankel tensors make for better interpolators than Hankel matrices because the pairwise Hankel tensor outer-product vectors are much shorter than the Hankel matrix outer-product vectors. This can be seen in the parameters collected for an exemplary multi-dimensional frequency slice to be filtered that is 15 traces on each side, which are shown in Table 1 below. Shown in Table I are the number of outer product parameters needed to model a single rank (and thus a single dip) using a Hankel matrix and pairwise Hankel tensor.

TABLE I

| Spatial Dimensions | # of Outer Product Parameters for a Hankel Matrix | # of Outer Product Parameters for a Pairwise Hankel Tensor | Ratio |
|---|---|---|---|
| 1 | 16 | 16 | 1 |
| 2 | 128 | 32 | 4 |
| 3 | 1024 | 48 | 21 |
| 4 | 8192 | 64 | 128 |

The first column in Table I lists different spatial dimensions, the second column the number of outer product parameters needed to model a single rank of the Hankel matrix, the third column the number of outer product parameters needed to model a single rank for the pairwise Hankel tensor, and the fourth column is the ratio of the second column to the third, for a particular spatial dimension, showing the relative amount of processing improvement using the pairwise Hankel tensor according to an embodiment (e.g., 8192/64=128).

Pairwise Hankel tensor completion according to an embodiment, therefore, estimates fewer parameters which, as those of skill in the art can appreciate, results in greater accuracy and robustness in the presence of noise in the trace data, or extreme sparseness of trace data, especially when there are a larger amount of spatial dimensions.

Method 600 then proceeds to step 614, wherein tensor completion is performed. Given tensor $T_H$ (from step 612), a low-rank approximation tensor $R_{H\text{-}C}$ needs to be found or determined. A low-rank approximation tensor $R_{H\text{-}C}$ is needed in order to improve interpolation results. According to embodiments, the signal resides in the lower ranks rather than the higher ranks, wherein the noise and effects of missing ranks reside. In other words, by calculating a low rank estimate, $R_{H\text{-}C}$, the effects of noise and the effects of missing or unknown traces are substantially eliminated. Further, as those of skill in the art can appreciate, determination of the low rank estimate $R_{H\text{-}C}$ is faster than a determination of a higher rank estimate. As those of skill in the art can further appreciate, there are many different strategies for obtaining the low rank tensor $R_{H\text{-}C}$, including Tucker decomposition or higher order singular value decomposition (HOSVD) (see, Kreimer, N., et al., 2011, "A tensor Higher Order Singular Value Decomposition for Pre-Stack Simultaneous Noise-Reduction and Interpolation," 81st Annual International Meeting, SEG, Expanded Abstracts, 3069-3074) and nuclear norm minimization (see, Kreimer, N., et al., 2012, "Tensor Completion via Nuclear Norm Minimization for 5D Seismic Data Reconstruction," 82nd Annual International Meeting, SEG, Expanded Abstracts). According to an embodiment, a PARAFAC decomposition method can be used (see, Kolda, T. G., et al., 2009, "Tensor Decompositions and Applications," SIAM Review, 51, no. 3, 455-500). Given a tensor order p and rank k, the completed tensor $R_{H\text{-}C}$ can be modeled as shown in Equation (10):

$$R_{H-C} = \sum_{i=1}^{k} u_1^i \circ u_2^i \circ \ldots \circ u_p^i. \quad (11)$$

That is, the new low-rank tensor $R_{H\text{-}C}$, which needs to be determined to minimize the Frobenius norm (see Equation (4)), can be formed from the outer product series of vectors $u_n^i$, where n varies from 1 to p, the order, and i, from 1 to k, the rank.

However, as those of skill in the art can appreciate, there is no algorithm to determine the vectors $u_j^i$, wherein i=1 . . . k, and j=1 . . . p to minimize Equation (4) in every case. Nevertheless, as those of skill in the art can further appreciate, there are many algorithms that give reasonable solutions, the simplest being Alternating Least Squares (ALS). According to the method of ALS, a first set of vectors is approximated, the tensor $R_{H\text{-}C}$ is calculated according to Equation (9), and then the Frobenius Norm is evaluated according to Equation (4). According to an embodiment, and as can be appreciated by those of skill in the art, there are numerous methods available for estimating or approximating the initial setting for the vectors. According to an embodiment, the first estimated set of vectors is estimated in regard to much longer vectors for Hankel matrix rank reduction. As can be further appreciated by those of skill in the art, this is a relatively fast method for estimating vectors because this is not a full scale trace interpolation, but one that is focused onto noise attenuation. The first set of long vectors is then decomposed into short vectors through a series of rank-1 approximations. As can be further appreciated by those of skill in the art, there are numerous other means for estimating an initial set of vectors according to an embodiment.

A new set of vectors $u_j^i$ is then determined using the linear least squares method, a new tensor $R_{H-C}$ is determined and new Frobenius norm, in turn, to determine whether it is being minimized. The process of calculating a new Frobenius norm based on a least squares minimized vector set $u_j^i$ is repeated until it is determined that the next Frobenius norm is not significantly smaller than the previously calculated Frobenius norm, meaning that the previously calculated Frobenius norm is near the minimum, and the algorithm ends. The tensor $R_{H-C}$ can then be constructed from the vector set $u_j^i$ that resulted in the minimum Frobenius norm.

As described above, each minimization step is a series of linear least-squares problems, one for every element of $u_j^i$. Missing tensor elements, representing missing traces in the grid, are handled by ignoring these elements (that is, by omitting their rows in the linear system) during each least-squares solution, so that they have no effect on the minimization. As in method 500, when method 600 completes tensor $T_H$ to form $R_{H-C}$ in method step 614 according to an embodiment, as just described, $R_{H-C}$ provides an approximation to the unknown tensor elements, and thus to the missing traces. By omitting the unknown traces, the solution of the completed tensor RH-C depends only upon the known data; yet, when recomposed, the completed tensor includes the missing data, to a high degree of accuracy, because of the knowledge of the method that the signal is included in the low-rank tensor. Further processing, as described in regard to method 500 and steps 518-520, is then performed in method 600, steps 618-620, to recover the missing data and form a set of interpolated data according to an embodiment.

According to these embodiments, there are several reasons why use of pairwise Hankel tensors within method 600 as described above provides such good results for interpolation of missing and/or corrupted and/or noisy seismic data. First, the pairwise Hankel tensors obey the Exactness theorem, which means that these embodiments can accurately model the expected form of the signal. Secondly, the pairwise Hankel tensors make the length of the tensor relatively short, which means that a single rank signal, i.e., a single plan wave, can be described with fewer values than other similar processes. The tensor relative shortness further means that the statistical estimation is both accurate and dependable. Third, the pattern restricts the solution to the summation of waves that are highly planar, much more so than the direct or Hankel matrix patterns. As those of skill in the art can appreciate, a further benefit of the highly planar solution is that the restriction aids in the dependability and accuracy of the method. That is, a less planar or "looseness" is undesirable, particularly for highly sparse or noisy data. While signals that strongly curve might initially be more difficult to model, method 600 according to an embodiment can compensate for that by using a higher rank k.

According to further embodiments, other advantages also exist. For example, method 600 for interpolation of seismic data using pairwise Hankel tensor completion according to an embodiment runs much faster than a method that incorporates Hankel matrix completion, even with the speed-ups described in the article by Gao, J., et al., 2013, "A Fast Reduced-Rank Interpolation Method for Prestack Seismic Volumes that Depend on Four Spatial Dimensions," Geophysics, 78, no. 1, V21-V30. According to a further embodiment, the recursive nature of method 600, including construction of the pairwise Hankel tensor, allows computations for each spatial dimension to be conducted separately, and the tensor need not be specifically formed at any particular stage.

Following formation and subsequent completion of the pairwise Hankel tensor $R_{H-C}$ in step 614, method 600, proceeds to step 616, wherein recovery of the interpolated frequency slice from the completed tensor $R_{H-C}$ occurs, in a manner substantially similar to that as was previously described in regard to method 500. As in method 500, in the method 600, the process of recovering the interpolated frequency slice is performed using the known technique of averaging over every tensor element in which each frequency slice value was originally placed. At this point, the recovered interpolated data is in frequency slice form, and in the f-x domain. Consequently, therefore, in step 618, method 600 performs an inverse DFT for each interpolated trace in the f-x domain to obtain interpolated trace data in the t-x domain. This t-x trace data is represented as Trace Data$_{Interpolated}$. In step 620, method 600 then combines the interpolated trace data, Trace Data$_{Interpolated}$, with the original trace data, Trace Data$_{Original}$, to obtain complete trace data, Trace Data$_{Complete}$. In method step 622 further processing and/or displaying of the trace data occurs.

To pictorially illustrate the above-described benefits of the embodiments, attention is now directed to FIGS. 9A-D, which illustrates interpolation of a 21×21 seismic data trace grid, with varying gaps of missing data, using both method 600 for interpolation of seismic data using pairwise Hankel tensor completion according to an embodiment and method 500 using a Hankel matrix completion. The comparison shown in FIGS. 9A-D involves the use of synthetic data, in two spatial dimensions. Only a slice near the middle of the grid is shown. A comparison to the direct tensor interpolation method is not made, since, as those of skill in the art can appreciate, it does a poor job in two spatial dimensions due its lack of constraints. The results of FIGS. 9A-D illustrate that interpolation using a pairwise Hankel tensor and method 600 according to an embodiment is better able to handle large gaps. In comparing the interpolated results across FIGS. 9A-D, it can be seen and understood by those of skill in the art, that the results for the 11×11 and 13×13 gaps are relatively comparable, but as the gaps increase, method 600 according to an embodiment shows a marked improvement in interpolation results, i.e., the Hankel matrix interpolation results are poorer especially for the 17×17 gap example.

Attention is now directed to FIGS. 10A-E, which illustrates interpolation of a 21×21 seismic data trace grid, with varying gaps of missing data, using both method 600 for interpolation of seismic data using pairwise Hankel tensor completion according to an embodiment and Hankel matrix completion. The comparison shown in FIGS. 10A-E involves the use of synthetic data, in four spatial dimensions. Only a one-dimensional slice of the grid is shown. The raw un-decimated synthetic data is shown in FIG. 10A. Most of the traces were removed at random, and then both the Hankel matrix and pairwise Hankel tensor interpolators were applied to recreate the synthetic data (i.e., each of the Hankel matrix interpolations (upper row of FIGS. 10B-E) and the pairwise Hankel tensor method interpolations according to an embodiment (lower row of FIGS. 10B-E) should be compared to FIG. 10A). In the Figures, "90% sparse" means that 90% of the traces were removed, leaving only 10% of the raw traces (from FIG. 10A). Those of skill in the art can appreciate that the results of FIGS. 10B-E illustrate that interpolation using a pairwise Hankel tensor and method 600 according to an embodiment is better able to handle large sparseness. In comparing the interpolated results across FIGS. 10A-E, it can be seen and understood by those of skill in the art, that while the results for method 600 for interpolation of seismic data using pairwise Hankel tensor completion according to an embodiment do fall off as the sparseness reaches 98%, the results of interpolation using method 600 according to an embodiment are still clearly better than those when using a Hankel matrix. In particular, method 600 for interpolation of seismic data using pairwise Hankel tensor completion according to an embodiment does a better job of preserving curvature.

Figures 11A, 11B:
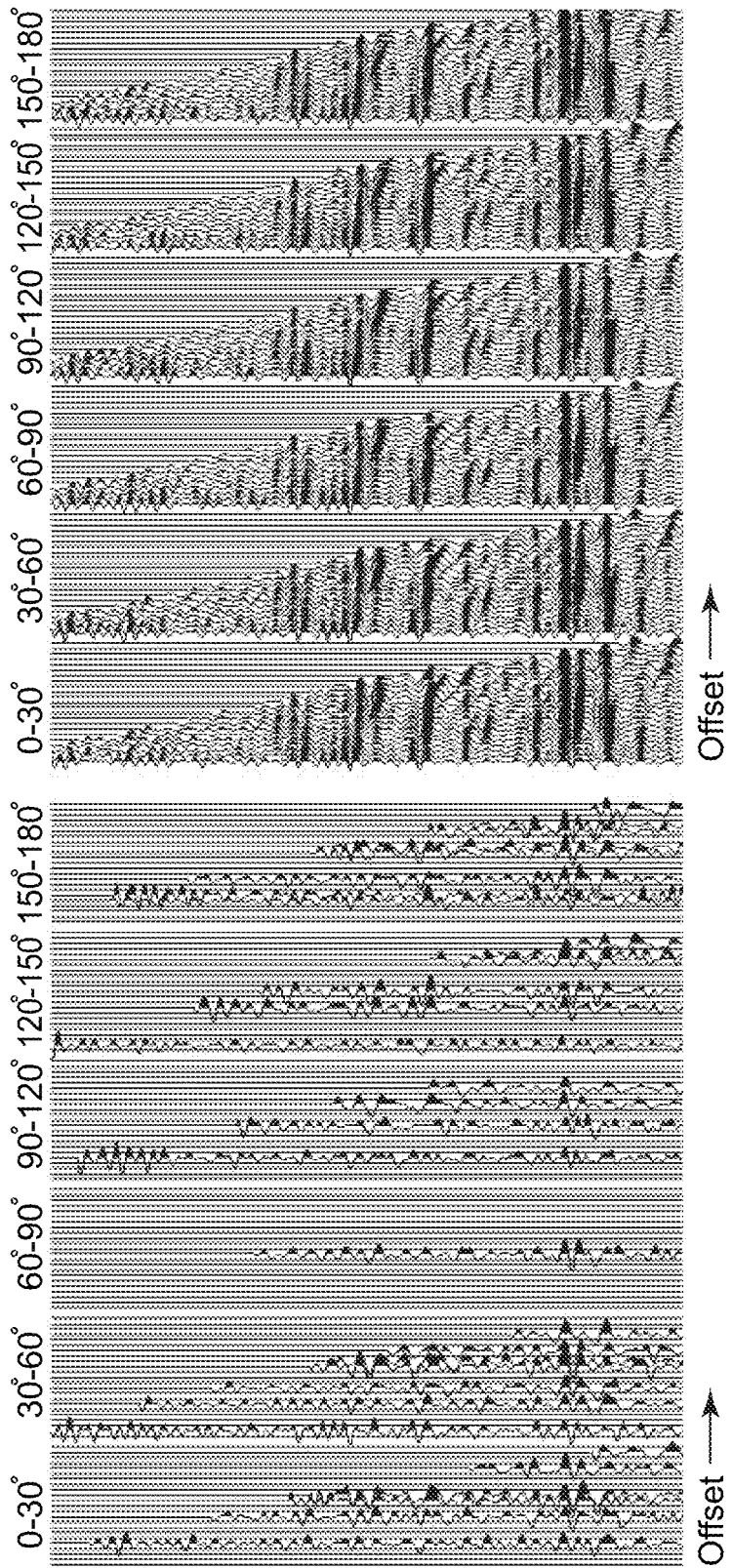
FIG. 11A illustrates a real three dimensional common mid-point gather plotted by azimuth sector and offset.
FIG. 11B illustrates the same gather following interpolation using the pairwise Hankel tensor completion as shown and described in regard to FIG. 6 according to an embodiment.
Figures 12A, 12B:
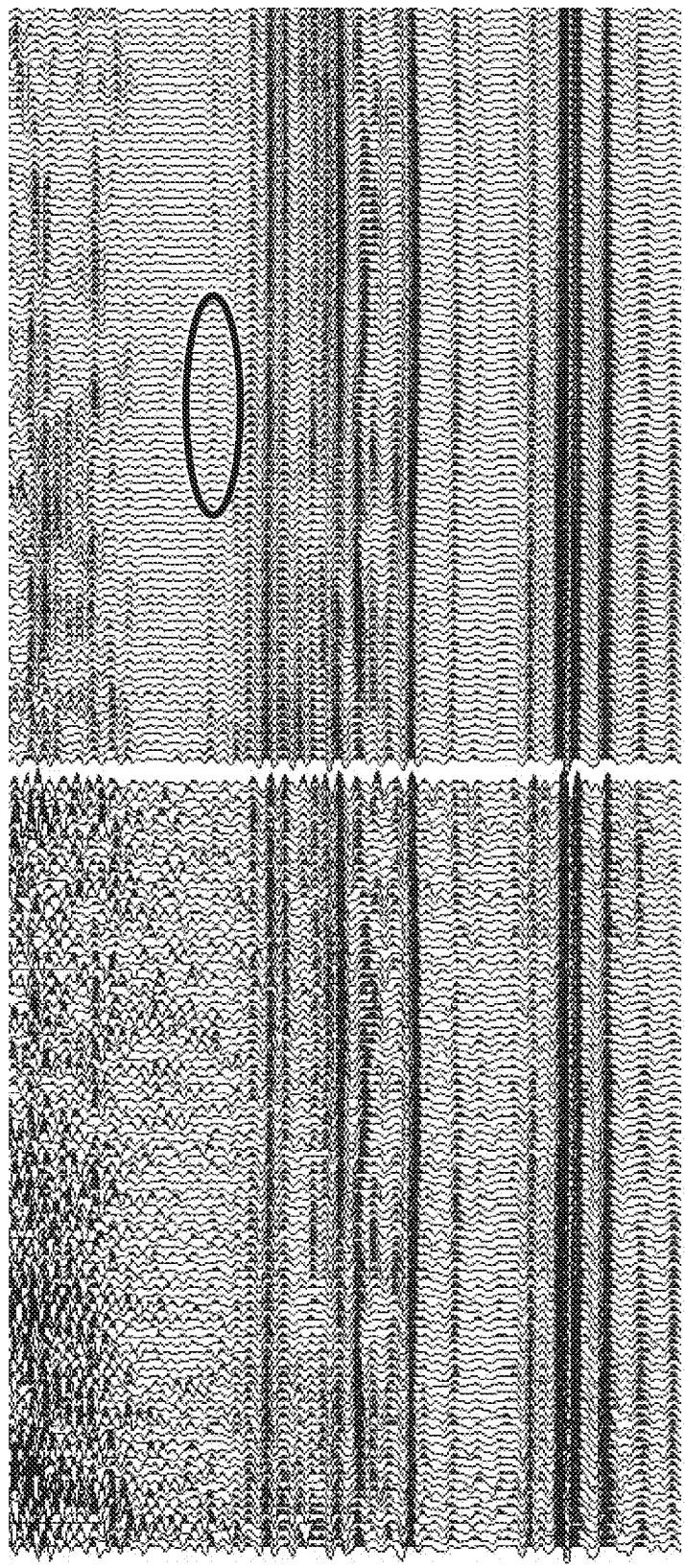
FIG. 12A illustrates a common mid-point stack of the gathers from FIG. 11A without interpolation.
FIG. 12B illustrates the same gather from FIG. 11A following interpolation using the pairwise Hankel tensor completion as shown and described in regard to FIG. 6 according to an embodiment.

FIG. 11A illustrates a real sample of trace data from a 3D common midpoint (CMP) gather plotted by azimuth sector and offset and FIG. 11B illustrates the same data of FIG. 11B following implementation of method 600 for interpolation of seismic data using 5D pairwise Hankel tensor completion according to an embodiment. The gather now has a complete set of offsets and azimuths. It can be appreciated by those of skill in the art that the data of FIG. 11B is much more complete than the data of FIG. 11A, regardless of offset position. FIG. 12A illustrates a CMP stack of the gathers of FIG. 11A without interpolation and FIG. 12B illustrates the data of FIG. 12A following implementation of method 600 for interpolation of seismic data using pairwise Hankel tensor completion according to an embodiment. The CMP stack of FIG. 12B illustrates that a subtle event (the oval) has been revealed by interpolation using method 600 according to an embodiment.

As those of skill in the art can appreciate, use of method 600 for interpolation of seismic data using pairwise Hankel tensor completion according to an embodiment is a novel means of interpolation that is computationally fast and demonstrates a greater ability to handle large gaps or high sparseness of trace data than existing completion methods.

Figure 13:
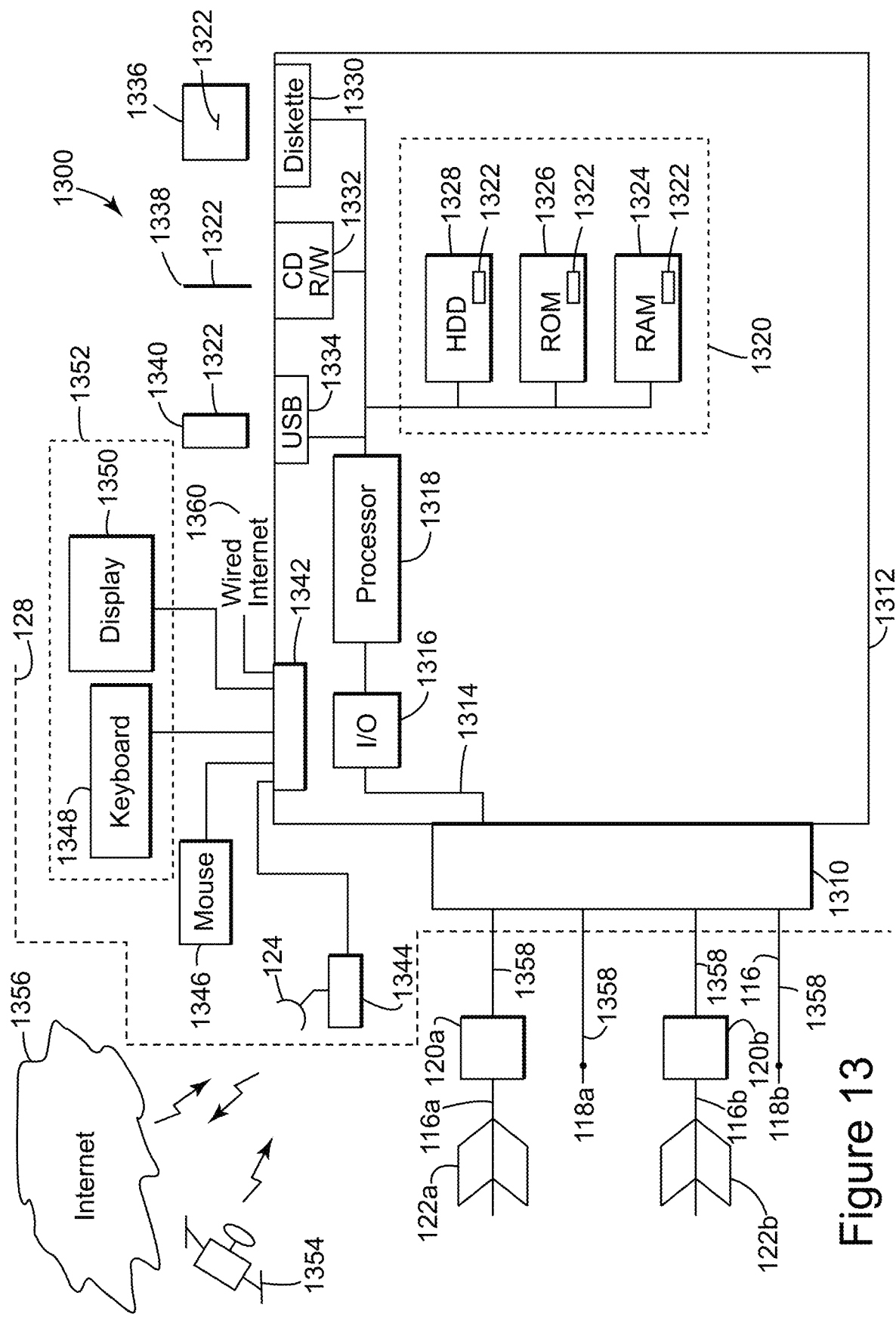
FIG. 13 illustrates a marine seismic data acquisition system suitable for use to implement a method for seismic data interpolation using pairwise Hankel tensor completion according to an embodiment.

FIG. 13 illustrates marine seismic data collection system 1300 suitable for use to implement method 600 for seismic data interpolation using pairwise Hankel tensor completion according to an embodiment. Marine seismic data collection system 1300 includes, among other items, server 1312, source/receiver interface 1310, internal data/communications bus (bus) 1314, processor input/output (I/O) 1316, processor(s) 1318 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 1334, compact disk (CD)/digital video disk (DVD) read/write (R/W) drive 1332, floppy diskette drive 1330 (though less used currently, many servers still include this device), and data storage unit 1320.

Data storage unit 1320 itself can comprise hard disk drive (HDD) 1328 (these can include conventional magnetic storage media, but, as is becoming increasingly more prevalent, can include flash drive-type mass storage devices 1340, among other types), ROM device(s) 1326 (these can include electrically erasable (EE) programmable ROM (EEPROM) devices, ultra-violet erasable PROM devices (UVPROMs), among other types), and random access memory (RAM) devices 1324. Usable with USB port 1334 is flash drive device 1340, and usable with CD/DVD R/W device 1332 are CD/DVD disks 1338 (which can be both read and writeable). Usable with diskette drive device 1330 are floppy diskettes 1336. Each of the memory storage devices, or the memory storage media (1324, 1326, 1328, 1336, 1338, and 1340, among other types), can contain parts or components, or in its entirety, executable software programming code (software) 1322 that can implement part or all of the portions of the method described herein. Further, processor 1318 itself can contain one or different types of memory storage devices (most probably, but not in a limiting manner, RAM memory storage media 1324) that can store all or some of the components of software 1322.

In addition to the above described components, marine seismic data acquisition system 1300 also comprises user console 1352, which can include keyboard 1348, display 1350, and mouse 1346. All of these components are known to those of ordinary skill in the art, and this description includes all known and future variants of these types of devices. Display 1350 can be any type of known display or presentation screen, such as liquid crystal displays (LCDs), light emitting diode displays (LEDs), plasma displays, cathode ray tubes (CRTs), among others. User console 1352 can include one or more user interface mechanisms such as a mouse, keyboard, microphone, touch pad, touch screen, voice-recognition system, among other inter-active inter-communicative devices.

User console 1352, and its components if separately provided, interface with server 1312 via server input/output (I/O) interface 1342, which can be an RS232, Ethernet, USB or other type of communications port, or can include all or some of these, and further includes any other type of communications means, presently known or further developed. Marine seismic data acquisition system 1300 can further include communications satellite/global positioning system (GPS) transceiver device 1344 (to receive signals from GPS satellites 1354), to which is electrically connected at least one antenna 124 (according to an embodiment, there would be at least one GPS receive-only antenna, and at least one separate satellite bi-directional communications antenna). Marine seismic data acquisition system 1300 can access internet 1356, either through a hard wired connection 1360, via I/O interface 1342 directly, or wirelessly via antenna 124, and transceiver 1344.

Server 1312 can be coupled to other computing devices, such as those that operate or control the equipment of ship 102, via one or more networks. Server 1312 can be part of a larger network configuration as in a global area network (GAN) (e.g., internet 1356), which ultimately allows connection to various landlines.

According to a further embodiment, marine seismic data acquisition system 1300, being designed for use in seismic exploration, will interface with one or more sources 118 (e.g., 118a and 118b) and one or more receivers 120 (e.g., 120a and 120b). These, as previously described, are attached to streamers 116 to which are also attached birds 122 (e.g., 122a and 122b that are useful to maintain positioning. As further previously discussed, sources 118 and receivers 120 can communicate with server 1312 either through an electrical cable that is part of streamer 116, or via a wireless system that can communicate via antenna 124 and transceiver 1344 (collectively described as communications conduit 1358).

According to further embodiments, user console 1352 provides a means for personnel to enter commands and configuration into marine seismic data recording/processing system 128 (e.g., via a keyboard, buttons, switches, touch screen and/or joy stick). Display device 1350 can be used to show: streamer 116 position; visual representations of acquired data; source 118 and receiver 120 status information; survey information; and other information important to the seismic data acquisition process. Source and receiver interface unit 1310 can receive the hydrophone seismic data from receiver 120 though streamer communication conduit 1358 (discussed above) that can be part of streamer 116, as well as streamer 116 position information from birds 122; the link is bi-directional so that commands can also be sent to birds 122 to maintain proper streamer positioning. Source and receiver interface unit 1310 can also communicate bi-directionally with sources 118 through the streamer communication conduit 1358 that can be part of streamer 116. Excitation signals, control signals, output signals and status information related to source 118 can be exchanged by streamer communication conduit 1358 between marine seismic data acquisition system 1300 and source 118.

Bus 1314 allows a data pathway for items such as: the transfer and storage of data that originate from either the source sensors or streamer receivers; for processor 1318 to access stored data contained in data storage unit memory 1320; for processor 1318 to send information for visual display to display 1352; or for the user to send commands to system operating programs/software 1322 that might reside in either the processor 1318 or the source and receiver interface unit 1310.

Marine seismic data collection system 1300 can be used to implement method 600 for pairwise Hankel tensor completion seismic data interpolation according to an embodiment. Hardware, firmware, software or a combination thereof may be used to perform the various steps and operations described herein. According to an embodiment, software 1322 for carrying out the above discussed steps can be stored and distributed on multi-media storage devices such as devices 1324, 1326, 1328, 1330, 1332, and/or 1334 (described above) or other form of media capable of portably storing information (e.g., universal serial bus (USB) flash drive 1322). These storage media may be inserted into, and read by, devices such as the CD-ROM drive 1332, disk drives 1330, 1328, among other types of software storage devices.

The above embodiments were discussed without specifying what type of seismic receivers 120 are used to record the seismic data. In this sense, it is known in the art to use, for a marine seismic survey, streamers 116 that are towed by one or more vessels/ships 102 and streamers 116 include seismic receivers/detectors 120. The streamers 116 can be horizontal or slanted or having a curved profile as illustrated in FIG. 14.

Figure 14:
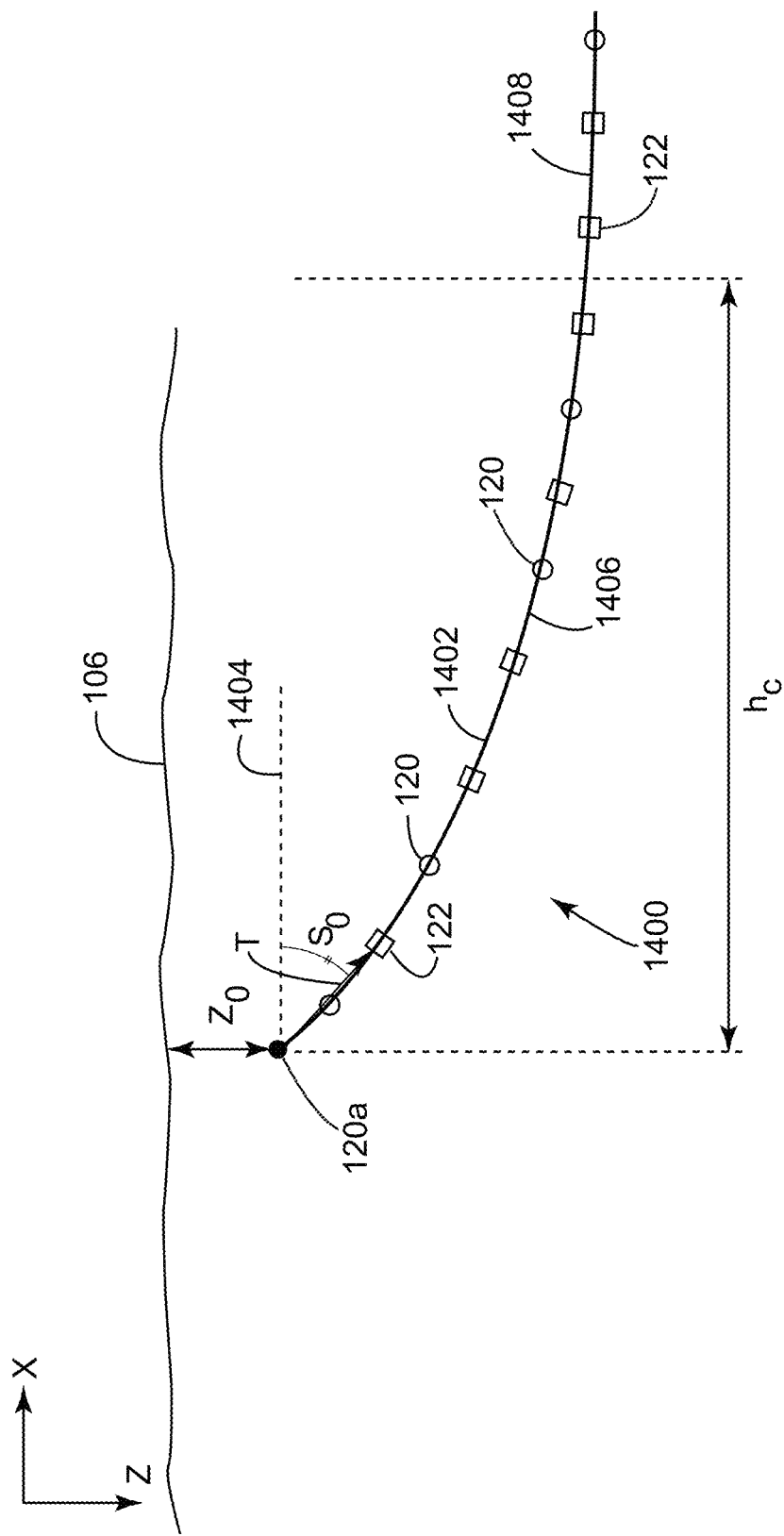
FIG. 14 illustrates a partial side view of another embodiment of the marine seismic exploration system shown in FIG. 1, wherein a curved streamer profile is implemented according to an embodiment.

The curved streamer 1400 of FIG. 14 includes a body or cable 1402 having a predetermined length; a plurality of detectors 120 provided along the body 1402; and a plurality of birds 122 provided along body 1402 for maintaining the selected curved profile. Curved streamer 1400 is configured to flow underwater when towed such that the plurality of detectors 120 is distributed along the curved profile. The curved profile can also be described by as parameterized curve, e.g., a curve described by (i) a depth $z_0$ of a first detector 120 (measured from the water surface 106), (ii) a slope $s_0$ of a first portion T of body 1402 with an axis 1404 substantially parallel with water surface 106, and (iii) a predetermined horizontal distance $h_c$ between the first detector 120a and an end of the curved profile. It should be noted that not the entire curved streamer 1400 has to have the curved profile. In other words, the curved profile should not be construed to always apply to the entire length of curved streamer 1400. While this situation is possible, the curved profile may be applied only to a first portion 1406 of curved streamer 1400. In other words, curved streamer 1400 can have (i) only a first portion 1406 having the curved profile or (ii) a first portion 1406 having the curved profile and a second portion 1408 having a flat profile, the two portions being attached to each other.

Figure 15:
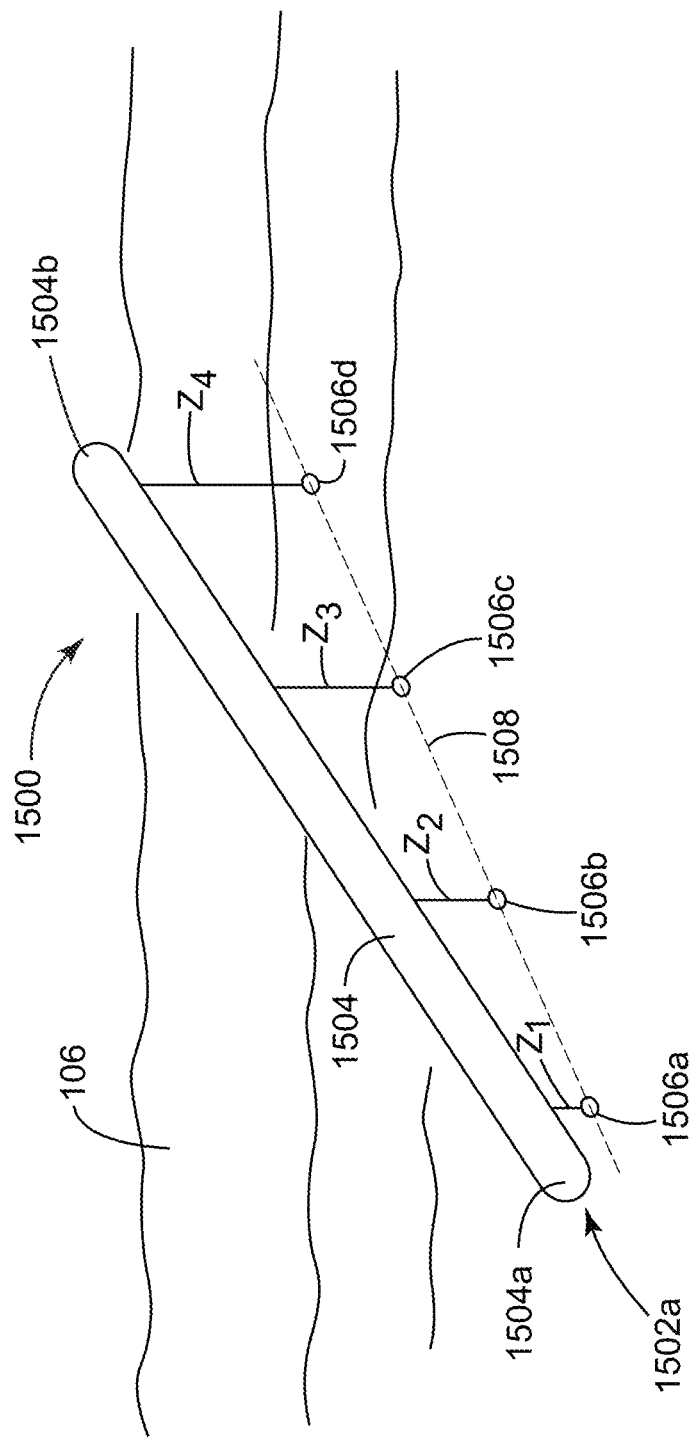
FIG. 15 illustrates a multi-level source for use with the marine seismic exploration system shown in FIG. 1 according to an embodiment.

Further, the above embodiments may be used with multi-level source 1500. FIG. 15 illustrates multi-level source 1500 for use with marine seismic exploration system 100 shown in FIG. 1 according to an embodiment. Multi-level source 1500 has one or more sub-arrays 1502a. First sub-array 1502a has a float 1504 that is configured to float at the water surface 106 or underwater at a predetermined depth. A plurality of source points 1506a-d can be suspended from float 1504 in a known manner. First source point 1506a can be suspended closest to the head 1504a of float 1504, at a first depth z1. A second source point 1506b can be suspended next, at a second depth z2, different from z1. A third source point 1506c can be suspended next, at a third depth z3, different from z1 and z2, and so on. FIG. 15 shows, for simplicity, only four source points 1506a-d, but an actual implementation may have any desired number of source points 1506. In one application, because source points 1506 can be distributed at different depths, the source points 66 at the different depths are not simultaneously activated. In other words, the source array is synchronized, i.e., a deeper source point 1506 is activated later in time (e.g., 2 ms for 3 m depth difference when the speed of sound in water is 1500 m/s) such that corresponding sound signals produced by the plural source points 1506 coalesce, and thus, the overall sound signal produced by the source array appears as being a single sound signal.

The depths z1 to z4 of the source points of the first sub-array 1502 can obey various relationships. In one application, the depths of source points 1506 increase from head 1504a toward the tail 1504b of float 1504, i.e., z1<z2<z3<z4. In another application, the depths of source points 1506 decrease from head 1504a to tail 1504b of float 1506. In another application, source points 1506 are slanted, i.e., provided on an imaginary line 1508. In still another application, line 1508 is a straight line. In yet another application, line 1508 is a curved line, e.g., part of a parabola, circle, hyperbola, etc. In one application, the depth of the first source point 1506a for the sub-array 1502 is about 5 m and the largest depth of the last source point 1506d is about 8 m. In a variation of this embodiment, the depth range is between about 8.5 m and about 10.5 m or between about 11 m and about 14 m. In another variation of this embodiment, when line 1508 is straight, the depths of the source points 1506 increase by 0.5 m from a first source point to an adjacent source point. Those skilled in the art would recognize that these ranges are exemplary and these numbers may vary from survey to survey. A common feature of all these embodiments is that source points 1506 have variable depths so that a single sub-array 1502 exhibits multiple-level source points 1506.

It should be noted in the embodiments described herein that these techniques can be applied in either an "offline", e.g., at a land-based data processing center or an "online" manner, i.e., in near real time while on-board the seismic vessel. For example, data processing including interpolation using pairwise Hankel tensor completion according to method 600 can occur as the seismic data is recorded on-board seismic vessel 102. In this case, it is possible for pairwise Hankel tensor completion seismic interpolation according to method 600 data to be generated as a measure of the quality of the sampling run.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or non-volatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/non-volatile computer storage media. For example, the processor can access a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and method for 5D seismic interpolation by pairwise Hankel tensor completion. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Figure 16:
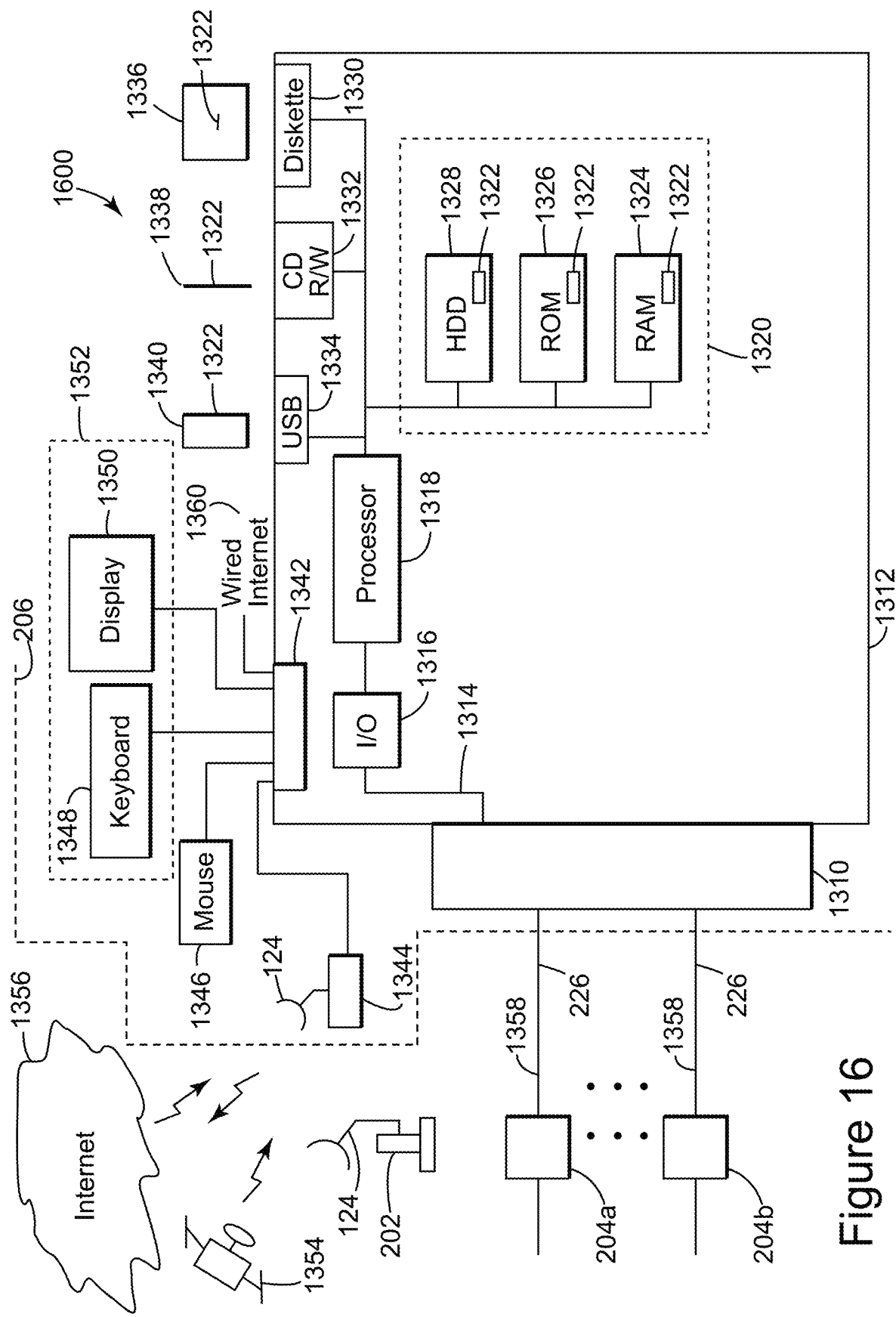
FIG. 16 illustrates a land seismic data acquisition system suitable for use to implement a method for method for seismic data interpolation using pairwise Hankel tensor completion according to an embodiment.

FIG. 16 illustrates a land seismic data acquisition system 1600 suitable for use to implement method 600 for pairwise Hankel tensor completion seismic data interpolation according to an embodiment. As those of skill in the art can appreciate, while the seismic data signals themselves can represent vastly different types of underground structure, and while the signal processing can, therefore, be vastly different as a consequence, the basic equipment remains essentially the same, and thus, FIG. 16 closely resembles FIG. 13 and includes many of the same components. As a result, in fulfillment of the dual goals of clarity and brevity, a detailed discussion of land seismic data acquisition system 1600 will be omitted (as like objects in FIG. 16 have been referenced similarly to those in FIG. 13), other than to note that the source of the signal, source/vibrators 202, and receivers 204 (e.g., 204a and 204b, communicate to source/receiver interface 1310 via cable 226/1358 that are similar to streamer 116/1358 in terms of command, control and communications functions.

As briefly discussed above, method 600 for pairwise Hankel tensor completion seismic data interpolation can be implemented in either or both of marine and land seismic data acquisition systems 1300, and 1600, respectively, as shown and described in reference to FIGS. 13 and 16. Further, it should be understood that marine seismic data acquisition system 1300, and hence method 600 for pairwise Hankel tensor completion, can be implemented in a marine seismic exploration system 100 as shown and described in reference to FIGS. 1, and 13-15. As such, all of the components shown and described in FIGS. 1 and 13-15 encompass all embodiments. Further, it should be understood that land seismic data acquisition system 1600, and hence method 600 for pairwise Hankel tensor completion of seismic data interpolation, can be implemented in land seismic exploration system 200 as shown and described in reference to FIGS. 2 and 16. As such, all of the components shown and described in FIGS. 2 and 16 encompass all embodiments.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

I claim:

1. A seismic survey method that improves an image of an explored subsurface geological formation by mitigating missing or faulty data, the method comprising:
generating seismic waves with seismic sources;
recording, with seismic receivers, seismic data upon detecting the seismic waves including ones traveling through the explored subsurface geological formation;
determining that one or more traces of the seismic data are missing, corrupt or noisy;
forming, with a computing device, a plurality of pairwise Hankel tensors from the acquired seismic data, so that a pairwise Hankel tensor corresponds to each of a plurality of originally collected frequency slices and has two orders for each spatial dimension of the originally collected frequency slices, a number of spatial dimensions being maxim four;
performing a tensor completion for at least one of the pairwise Hankel tensors, to obtain interpolated seismic data suitable to replace the one or more traces of the seismic data that are missing, corrupt or noisy;
combining the seismic data with the interpolated seismic data to obtain a complete set of traces; and
generating the image based on the complete set of traces, to estimate an oil and gas yielding potential of the explored subsurface geological formation.

2. The method of claim 1, wherein the plurality of pairwise Hankel tensors are formed by:
converting each of said seismic traces from a t-x domain to an f-x domain to form the plurality of frequency slices with frequencies ranging from $F_0$, of about 0 Hertz, to $F_N$, about a Nyquist frequency,
each of said plurality of originally collected frequency slices includes a first number of spatial dimensions.

3. The method of claim 2, wherein for a two spatial dimension frequency slice, S, with row dimension i and column dimension j, a fourth order pairwise Hankel tensor $T_{H(i,j,m,n)}$ is formed according to $$T_{H(i,j,m,n)} = S(i+j-1, m+n-1),$$

wherein the pairwise Hankel tensor $T_{H(i,j,m,n)}$, i is a row position and j is a column position within each of a sub-matrix within said pairwise Hankel tensor, $T_{H(i,j,m,n)}$, and m is a column position and n is a row position of the sub-matrices for the pairwise Hankel tensor $T_{H(i,j,m,n)}$.

4. The method of claim 1, wherein said forming of the plurality of pairwise Hankel tensors comprises:
determining a number of spatial dimensions D of each of said plurality of originally collected frequency slices S;
determining a length of each of said spatial dimensions D, wherein for each dimension i of said plurality of frequency slices, i=1 . . . , D a dimension is L(i) is length;
specifying a pairwise Hankel tensor number of modes as 2D;
specifying a length of each of said pairwise Hankel tensor modes as L(i)/2+1 for a first and any odd number of said tensor modes, (L(i)+1)/2 for a second and any even number of said pairwise Hankel tensor modes, and further
wherein if any tensor mode length is a fraction said fractional tensor mode length is reduced to a next lowest whole number; and a value for any particular pairwise Hankel tensor element is $$S(j_1+j_2-1, j_3+j_4-1, \ldots, j_m+j_n-1),$$

wherein m=2D-1, n=2D, and j's range over all possible values for said pairwise Hankel tensor.

5. The method of 1, wherein said performing of tensor completion comprises:
determining a low rank tensor R that minimizes $\|Z(T_H-R)\|_F$, which is a Frobenius norm of said pairwise Hankel tensor TH, wherein $\|\cdot\|_F$ is the Frobenius norm of the tensor elements, and $Z(\cdot)$ is an operator that zeroes out all elements that are unknown in $T_H$.

6. The method of claim 5, wherein said tensor R provides an approximation to said unknown tensor elements of said Hankel tensor $T_H$.

7. The method of claim 6, wherein said determining of the low rank tensor R comprises:

evaluating $$R = \sum_{i=1}^{k} u_1^i \circ u_2^i \circ \ldots \circ u_p^i,$$

wherein said vectors $u_p^i$, are determined using a series of linear least squares approximations based on an initial estimate of said vectors $u_p^i$, and further wherein i is valued from 1 to k, k being said rank of said pairwise Hankel tensor T, and p is said order of said pairwise Hankel tensor T, said vectors iteratively changed to minimize the Frobenius norm of elements of said pairwise Hankel tensor T.

8. The method of claim 7, further comprising:
recovering said interpolated frequency slices from said determined low rank tensor R, by averaging over every tensor element in which each frequency slice value was originally placed.

9. The method of claim 1, wherein said combining of said plurality of interpolated frequency slices with said originally collected frequency slices to form a complete set of traces comprises:
performing an inverse discrete Fourier transform for each of said plurality of traces in the f-x domain to obtain interpolated trace data in said t-x domain; and
combining said interpolated traces in said t-x domain with original traces in said t-x domain that formed said original collected frequency slice data.

10. A seismic survey system that improves an image of an explored subsurface geological formation by mitigating missing or faulty data, comprising:
a receiver configured to acquire transmitted seismic data detecting seismic waves with seismic sources after the seismic waves travelled through the explored subsurface geological formation; and
a processor configured to,
determine that one or more traces of the seismic data are missing, corrupt or noisy;
form a plurality of pairwise Hankel tensors from said acquired seismic data, a respective pairwise Hankel tensor being formed for each of a plurality of originally collected frequency slices and each of the pairwise Hankel tensors having two orders for each spatial dimension of the originally collected frequency slices, a number of spatial dimensions being maxim four,
perform tensor completion at least one of said pairwise Hankel tensors to obtain interpolated seismic data suitable to replace the one or more traces of the seismic data that are missing, corrupt or noisy,
combine the seismic data with the interpolated seismic data to obtain a complete set of traces, and
generate the image of the explored subsurface geological formation based on the complete set of traces, for estimating an oil and gas yielding potential of the explored subsurface geological formation.

11. The system of claim 10, wherein said processor is further configured, when forming a plurality of pairwise Hankel tensors, to
convert each of said seismic trace data from a t-x domain to an f-x domain to form the plurality of frequency slices with frequencies ranging from $F_0$, of about 0 Hertz, to $F_N$, about a Nyquist frequency, and each of said plurality of originally collected frequency slices including a first number of spatial dimensions.

12. The system of claim 11, wherein, for a two spatial dimension frequency slice, S, with row dimension i and column dimension j, a fourth order pairwise Hankel tensor $T_{H(i,j,m,n)}$ is formed according to $$T_{H(i,j,m,n)} = S(i+j-1, m+n-1),$$

wherein the pairwise Hankel tensor $T_{H(i,j,m,n)}$, i is a row position and j is a column position within each of a sub-matrix within said pairwise Hankel tensor, $T_{H(i,j,m,n)}$, and m is a column position and n is a row position of the sub-matrices for the pairwise Hankel tensor $T_{H(i,j,m,n)}$.

13. The system of claim 10, wherein said processor is further configured to form the plurality of pairwise Hankel tensors by
determining a number of spatial dimensions D of each of said plurality of originally collected frequency slices S;
determining a length of each of said spatial dimensions D, wherein for each dimension i of said plurality of frequency slices, i=1 . . . , D a dimension is L(i) is length;
specifying a pairwise Hankel tensor number of modes as 2D;
specifying a length of each of said pairwise Hankel tensor modes as L(i)/2+1 for a first and any odd number of said tensor modes, (L(i)+1)/2 for a second and any even number of said pairwise Hankel tensor modes, and further wherein if any tensor mode length is a fraction said fractional tensor mode length is reduced to a next lowest whole number; and a value for any particular pairwise Hankel tensor element is $$S(j_1+j_2-1, j_3+j_4-1, \ldots, j_m+j_n-1),$$

wherein m=2D−1, n=2D, and j's range over all possible values for said pairwise Hankel tensor.

14. The system of claim 10, wherein said processor is further configured, when performing tensor completion, to determine a low rank tensor R that minimizes $\|Z(T_H - R)\|_F$, which is a Frobenius norm of said pairwise Hankel tensor TH, wherein $\|\cdot\|_F$ is the Frobenius norm of the tensor elements, and $Z(\cdot)$ is an operator that zeroes out all elements that are unknown in $T_H$.

15. The system of claim 14, wherein said tensor R provides an approximation to said unknown tensor elements of said Hankel tensor $T_H$.

16. The system of claim 14, wherein said processor is further configured, when determining a low rank tensor R, to evaluate $$R = \sum_{i=1}^{k} u_1^i \circ u_2^i \circ \ldots \circ u_p^i,$$

wherein said vectors $u_p^i$, are determined using a series of linear least squares approximations based on an initial estimate of said vectors $u_p^i$, and further wherein i is valued from 1 to k, k being said rank of said pairwise Hankel tensor T, and p is said order of said pairwise Hankel tensor T, said vectors iteratively changed to minimize the Frobenius norm of elements of said pairwise Hankel tensor T.

17. The system of claim 16, wherein said processor is further configured to recover said interpolated frequency slices from said determined low rank tensor R, by averaging over every tensor element in which each frequency slice value was originally placed.

18. The system of claim 10, wherein said processor is further configured, when combining said the seismic data with the interpolated seismic data, to perform an inverse discrete Fourier transform for each of said plurality of interpolated traces in the f-x domain to obtain interpolated trace data in said t-x domain, and combine said interpolated traces in said t-x domain with original traces in said t-x domain that formed said original collected frequency slice data.

19. The system of claim 10, wherein the system is a land seismic system.

20. The system of claim 10, wherein the system is a marine seismic system.

\* \* \* \* \*